(12) United States Patent
Trefny et al.

(10) Patent No.: US 8,484,980 B1
(45) Date of Patent: Jul. 16, 2013

(54) DUAL-MODE COMBUSTOR

(75) Inventors: Charles J Trefny, Olmsted Township, OH (US); Vance F Dippold, Lakewood, OH (US)

(73) Assignee: The United States of America as Represented by the Administrator of National Aeronautics and Space Administration, Washington, DC (US)

( * ) Notice: Subject to any disclaimer, the term of this patent is extended or adjusted under 35 U.S.C. 154(b) by 469 days.

(21) Appl. No.: 12/894,346

(22) Filed: Sep. 30, 2010

Related U.S. Application Data

(60) Provisional application No. 61/262,756, filed on Nov. 19, 2009.

(51) Int. Cl.
*F02K 7/08* (2006.01)

(52) U.S. Cl.
USPC .......................................................... 60/767

(58) Field of Classification Search
USPC .................................................. 60/767, 768
See application file for complete search history.

(56) References Cited

U.S. PATENT DOCUMENTS

| | | | |
|---|---|---|---|
| 3,667,233 A | 6/1972 | Curran et al. | |
| 3,782,115 A | 1/1974 | Johnson | |
| 3,815,356 A | 6/1974 | Burge et al. | |
| 3,864,907 A | 2/1975 | Curran | |
| 3,886,737 A | 6/1975 | Grieb | |
| 4,067,307 A | 1/1978 | Hofle et al. | |
| 4,372,110 A | 2/1983 | Cheng | |
| 4,644,746 A | 2/1987 | Hartman | |
| 5,052,176 A | 10/1991 | Labatut et al. | |
| 5,072,581 A | 12/1991 | Harshman | |
| 5,085,048 A * | 2/1992 | Kutschenreuter et al. | 60/768 |
| 5,253,474 A | 10/1993 | Correa et al. | |
| 5,317,866 A | 6/1994 | Murray et al. | |
| 5,419,117 A | 5/1995 | Greene | |
| 5,463,866 A | 11/1995 | Klees | |
| 5,727,382 A * | 3/1998 | Chevalier et al. | 60/768 |
| 6,050,078 A | 4/2000 | Paschereit et al. | |
| 6,470,672 B1 | 10/2002 | Buggele et al. | |
| 6,568,171 B2 | 5/2003 | Bulman | |
| 6,857,261 B2 | 2/2005 | Wilson et al. | |
| 6,983,587 B2 | 1/2006 | Shumate | |
| 7,296,396 B1 | 11/2007 | Wilson et al. | |
| 7,603,842 B2 | 10/2009 | Dujarric | |
| 2007/0175222 A1* | 8/2007 | Donohue et al. | 60/767 |
| 2008/0128547 A1* | 6/2008 | Pederson et al. | 244/55 |

OTHER PUBLICATIONS

Weber, R.J. and Mackay, J.S.: "An Analysis of Ramjet Engines Using Supersonic Combustion," NACA Technical Note 4386, Aug. 20, 1958.

(Continued)

*Primary Examiner* — Phutthiwat Wongwian
(74) *Attorney, Agent, or Firm* — Robert H. Earp, III

(57) ABSTRACT

A new dual-mode ramjet combustor used for operation over a wide flight Mach number range is described. Subsonic combustion mode is usable to lower flight Mach numbers than current dual-mode scramjets. High speed mode is characterized by supersonic combustion in a free-jet that traverses the subsonic combustion chamber to a variable nozzle throat. Although a variable combustor exit aperture is required, the need for fuel staging to accommodate the combustion process is eliminated. Local heating from shock-boundary-layer interactions on combustor walls is also eliminated.

15 Claims, 24 Drawing Sheets

OTHER PUBLICATIONS

Ferri, A.: "Possible Directions of Future Research in Air-Breathing Engines," Combustion and Propulsion, Fourth AGARD Colloqium, High Mach Number Air-Breathing Engines, Milan, Apr. 4-8, 1960; Editors A.L. Jaumotte, A.H. Lefebre, A.M. Rothrock, Pergamon Press, 1961, pp. 3-15.

Dugger, G.L.; "Comparison of Hypersonic Ramjet Engines with Subsonic and Supersonic Combustion," Combustion and Propulsion, Fourth AGARD Colloquium, High Mach Number Air-Breathing Engines, Milan, Apr. 4-8, 1960; Editors A.L. Jaumotte, A.H. Lefebre, A.M. Rothrock, Pergamon Press, 1961, pp. 84-119.

Analysis and Design of a Hypersonic Scramjet Engine With a Starting Mach Number of 4.00 by Kristen Nicole Roberts Presented to the Faculty of the Graduate School of The University of Texas at Arlington in Partial Fulfillment of the Requirements for the Degree of Master of Science in Aerospace Engineering The University of Texas at Arlington Aug. 2008.

Pandolfini, Peter P. and Friedman, Murray A.; "Instructions for Using Ramjet Performance Analysis (RJPA)," IBM-PC Version 1.24. The Johns Hopkins University Applied Physics Laboratory, JHU/APL-92-P175,1992.

Lander, H. and Nixon, A.C.; "Endothermic Fuels for Hypersonic Vehicles," Journal of Aircraft, vol. 8, No. 4, 1971, pp. 200-207.

Parallel Modeling of Three-Dimensionel Scramjet Combustor and Comparisons with Experiment's Results Zheng Zhong-hua Le Jialing (China Aerodynamics Research & Development Center, Mianyang 621000, China), Aug. 23, 2002.

Supersonic Free-Jet Combustion in a Ramjet Burner, Charles J. Trefny and Vance F. Dippold III NASA Glenn Research Center, Cleveland, Ohio, 44135, Jul. 26, 2010, Presented to The American Institute of Aeronautics and Astronautics.

* cited by examiner

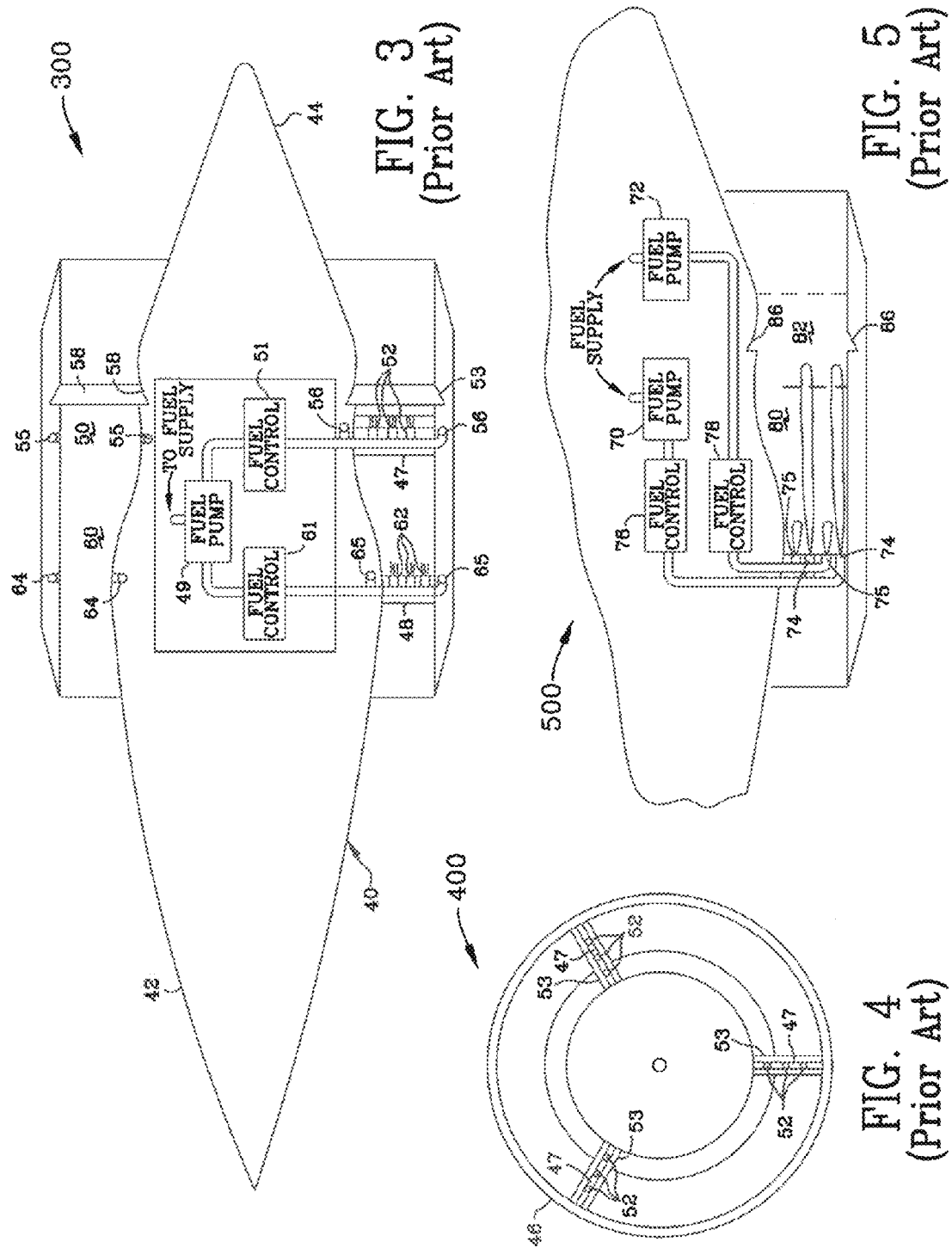

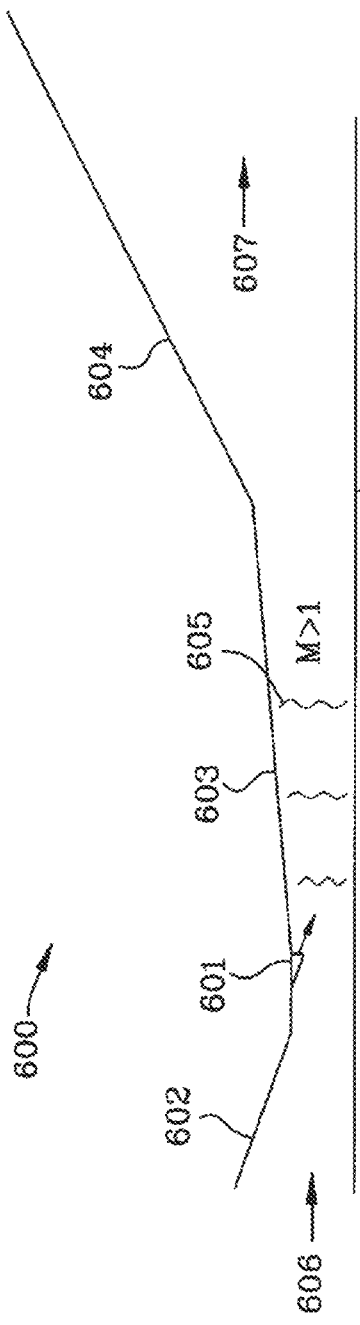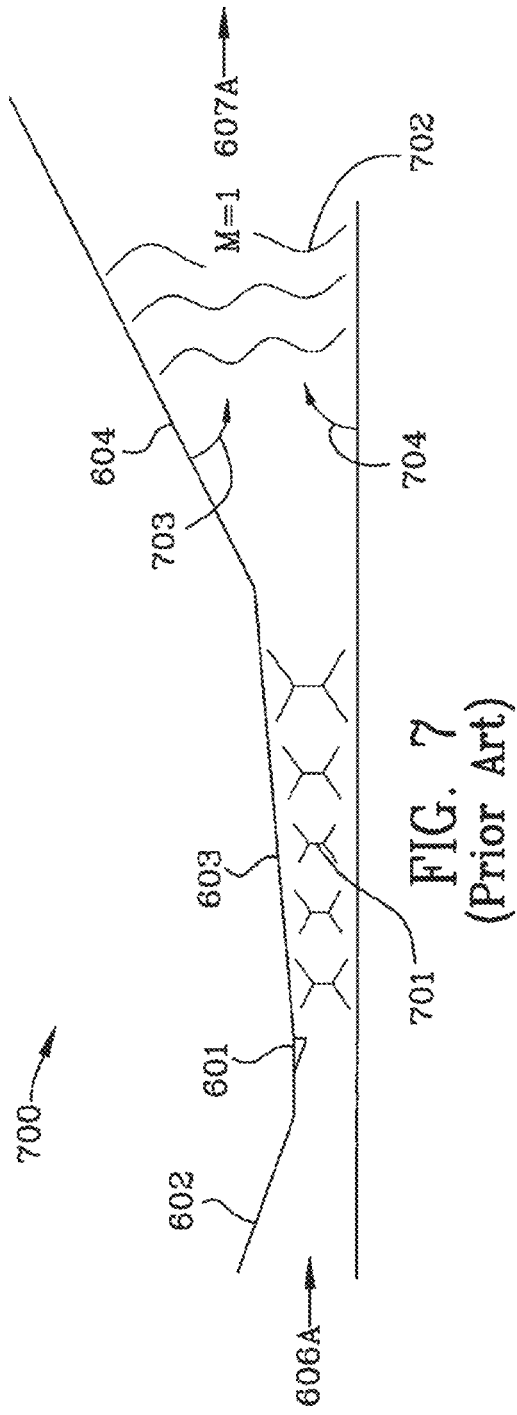

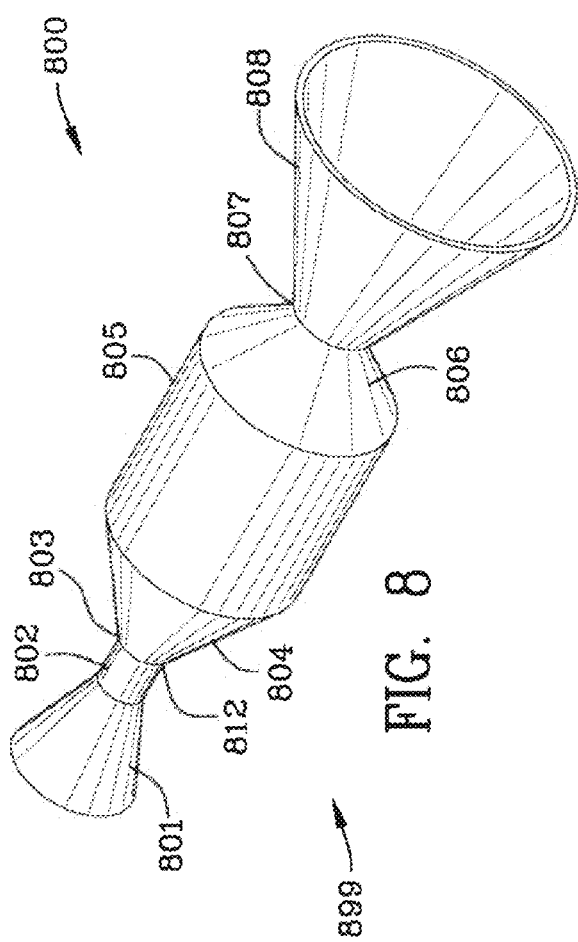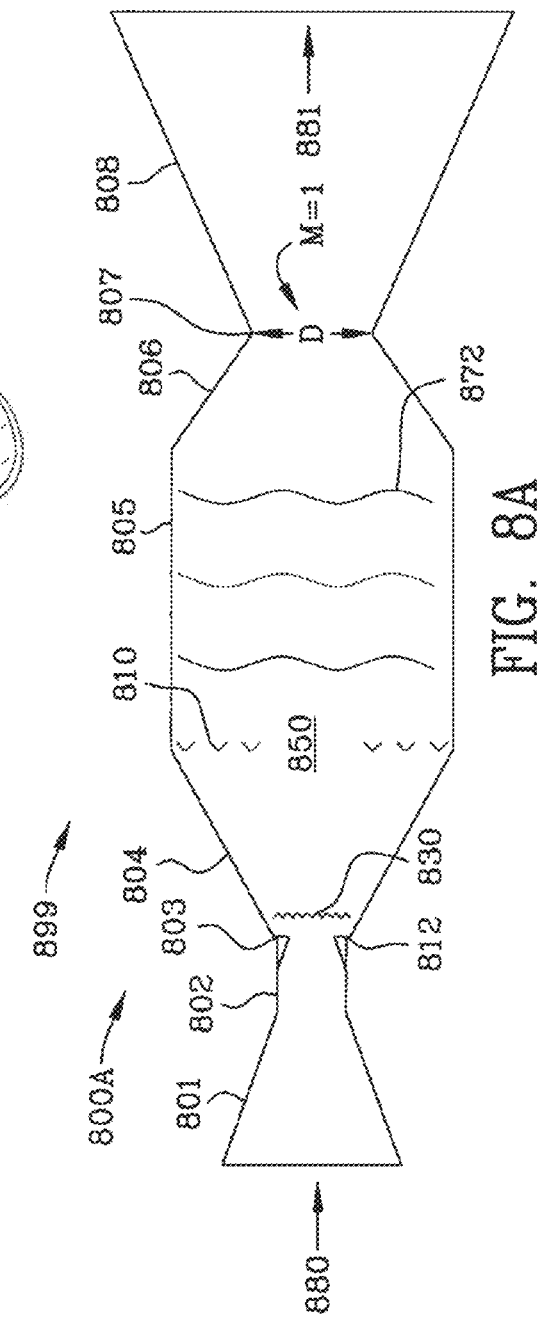

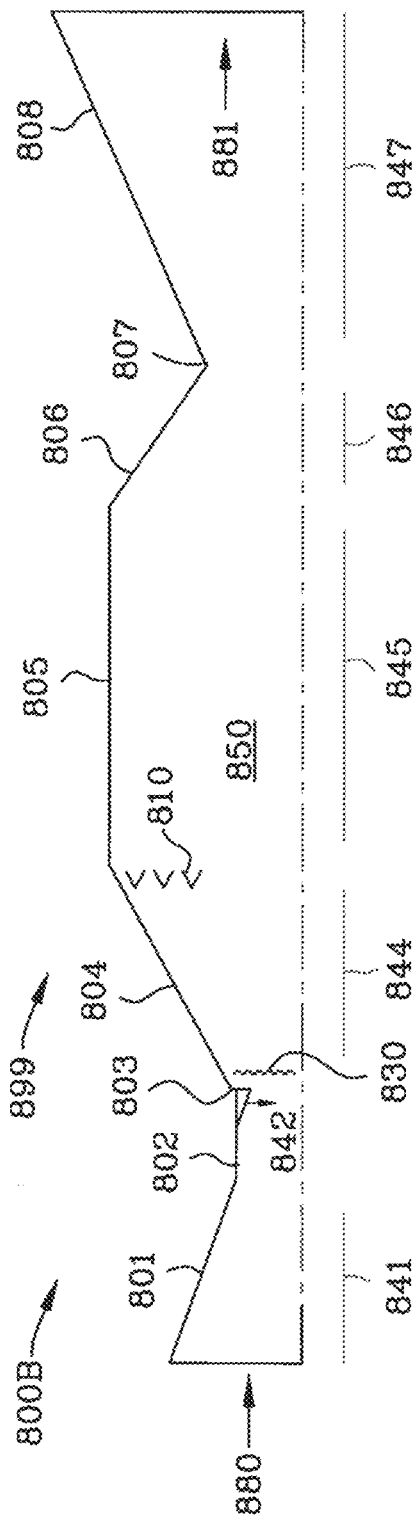
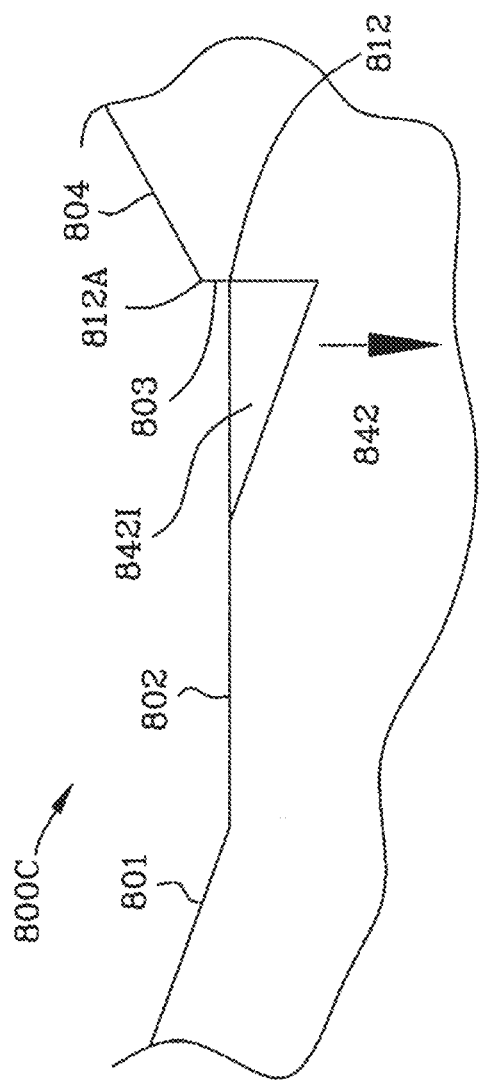

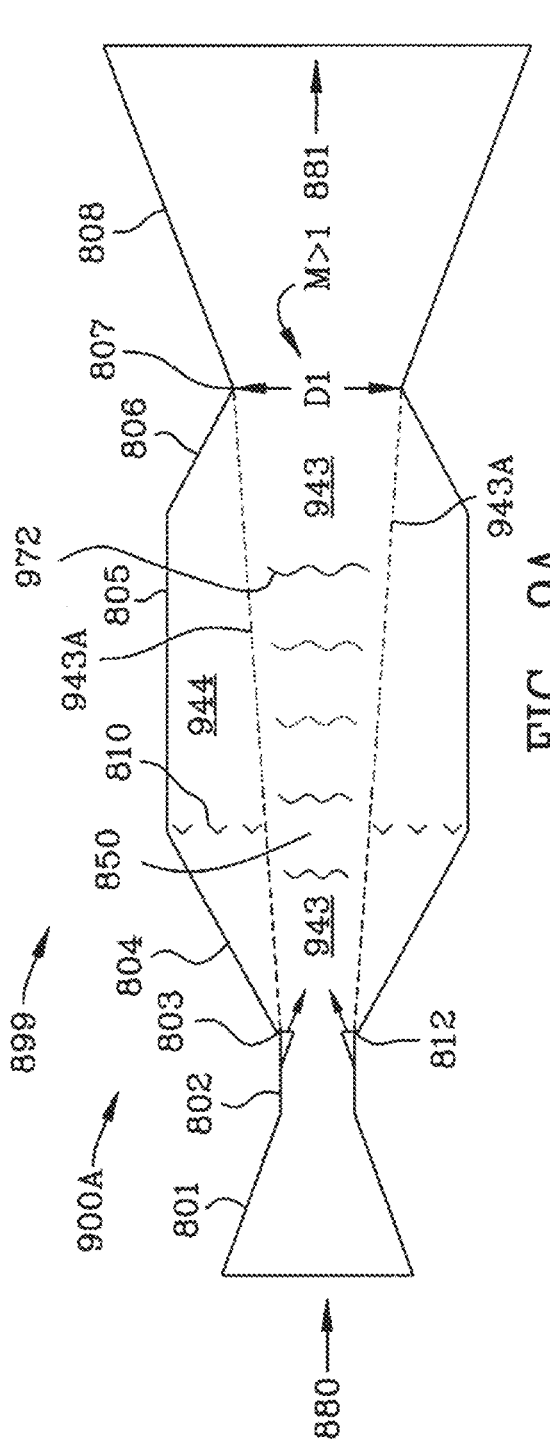
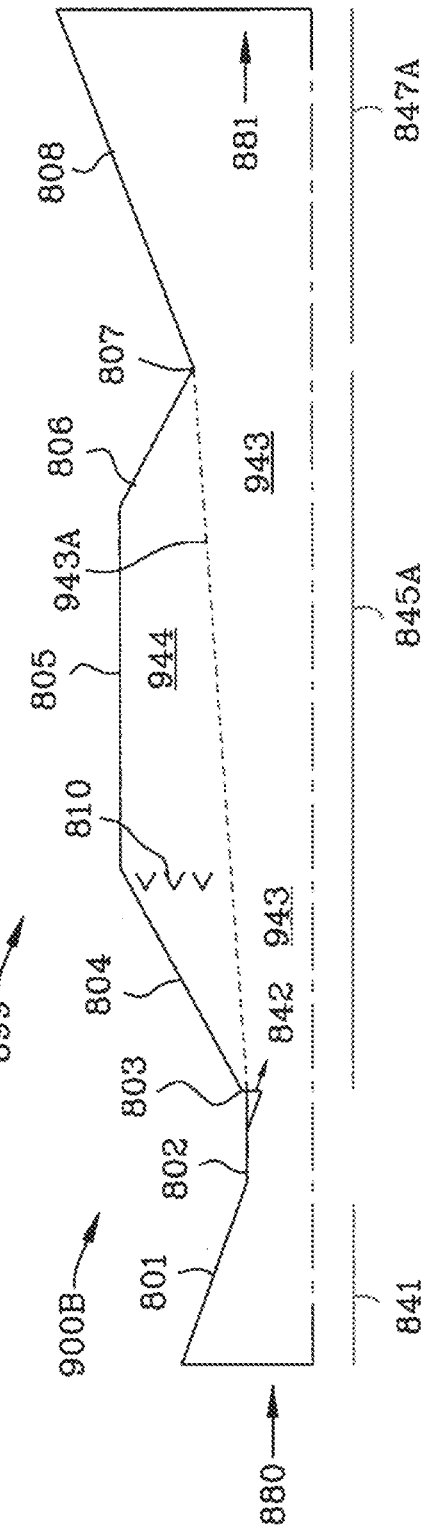
FIG. 9A
FIG. 9B

| x (in) | r (in) | | |
|---|---|---|---|
| 0.0000 | 4.7032 | Station i, Inflow | 1180 |
| 4.3702 | 4.7032 | Station 1, end of cylindrical inflow section | 1101 |
| 4.3702 | 5.1735 | Station 1, aft-facing step | |
| 23.4322 | 13.8195 | Station 2, begin cylindrical combustion chamber | 1102 |
| 51.0712 | 13.8195 | Station 7, end cylindrical combustion chamber | 1107 |
| 55.4138 | 9.7727 | Begin circular arc nozzle throat section | 1127 |
| 56.1154 | 9.1936 | Circular arc | |
| 56.8814 | 8.7029 | " " | |
| 57.7007 | 8.3076 | " " | |
| 58.5616 | 8.0134 | " " | |
| 59.4515 | 7.8247 | " " | |
| 60.3576 | 7.7440 | Station 8, nozzle throat | 1108 |
| 61.2669 | 7.7727 | " " | |
| 62.1662 | 7.9102 | " " | |
| 63.0424 | 8.1546 | " " | |
| 63.8830 | 8.5024 | End circular arc nozzle throat section | 1128 |
| 90.4398 | 21.4095 | Outflow station | 1129 |

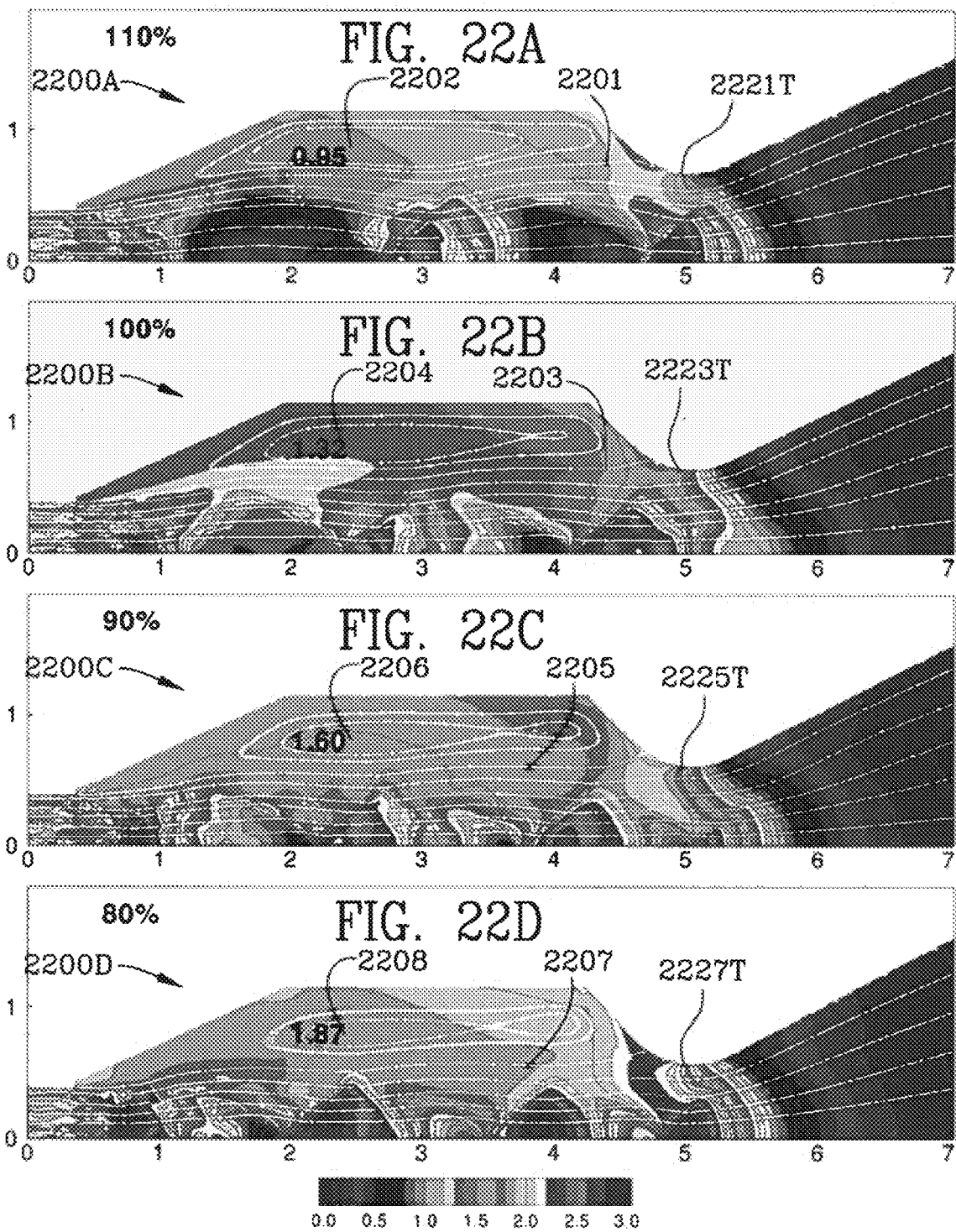

DUAL-MODE COMBUSTOR

CROSS-REFERENCE TO RELATED APPLICATIONS

This patent application claims priority to U.S. Provisional Patent Application Ser. No. 61/262,756 filed Nov. 19, 2009 which is incorporated herein by reference hereto in its entirety.

ORIGIN OF THE INVENTION

The invention described herein was made by employees of the United States Government and may be manufactured and used by or for the Government for Government purposes without the payment of any royalties thereon or therefor.

FIELD OF THE INVENTION

The invention is in the field of dual-mode combustors for use as a ramjet and a scramjet.

BACKGROUND OF THE INVENTION

Combined-cycle propulsion is considered when the high efficiency of air-breathing propulsion is desired over a broad Mach number range. Air-breathing access to space is one such application of current interest to NASA. The dual-mode scramjet is central to most combined-cycle schemes. Turbine-based combined-cycle (TBCC) systems use a turbine engine for low speed acceleration, and operate to a maximum flight Mach number in scramjet mode dictated by system considerations. TBCC systems are normally assumed to take-off horizontally, and use a second, rocket-powered stage to achieve orbit. Rocket-based combined-cycle (RBCC) schemes use chemical rocket propulsion for low speed acceleration. The high thrust-to-weight ratio of the rocket component allows for its integration within the air-breathing duct. RBCC systems are normally assumed to be launched vertically, and can operate from lift-off to orbit. Turbine-engines reach temperature and thrust limitations as Mach number increases. Rocket thrusters provide a high ratio of thrust-to-weight at any speed, but are very inefficient from the standpoint of specific impulse. In either case, it is advantageous to extend dual-mode scramjet operation to as low a Mach number as possible.

Supersonic combustion has long been recognized as a solution to problems associated with the severe stagnation conditions within a ramjet engine at high flight Mach number. Diffuser momentum loss, dissociation, non-equilibrium expansion losses, and structural loading are all relieved by transition to a supersonic combustion process. In general, the cross-sectional area of the supersonic combustor increases in the downstream direction to avoid thermal choking and excessive pressure gradients. The subsequent nozzle expansion process requires a more dramatic increase in cross-sectional area and is usually integrated with the vehicle aft end to provide the maximum possible area ratio.

In order to extend the operable flight Mach number range of the scramjet engine downward, toward the upper limit for turbojets or to limit rocket operation to as low a ΔV (speed range) as possible, "dual-mode" operation was introduced by Curran, et al. in U.S. Pat. No. 3,667,233. U.S. Pat. No. 3,667,233 is incorporated herein by reference hereto.

FIG. 1 is a prior art drawing from Curran et al., U.S. Pat. No. 3,667,233, and, in particular, is a schematic diagram partially in block form of a dual mode combustion chamber according to the invention.

FIG. 2 is a prior art drawing from Curran et al., U.S. Pat. No. 3,667,233, and, in particular, is a schematic cross section of the device of FIG. 1 showing one possible arrangement of the fuel injectors.

FIG. 3 is a prior art drawing from Curran et al., U.S. Pat. No. 3,667,233, and, in particular, is a schematic diagram partially in block form showing an annular configuration for the combustion chamber of FIG. 1.

FIG. 4 is a prior art drawing from Curran et al., U.S. Pat. No. 3,667,233, and, in particular, is a schematic end view of the device of FIG. 3 from the exhaust end.

FIG. 5 is a prior art drawing from Curran et al., U.S. Pat. No. 3,667,233, and, in particular, is a schematic diagram partially in block form of a modified fuel supply system for the device of FIG. 1.

Conceptually, a thermally-choked combustion process is established in the aft regions of the scramjet flowpath where the cross-sectional areas are greatest. As depicted in FIG. 7, the diverging scramjet duct acts as a subsonic diffuser, and the thermal throat is positioned so as to produce the required back-pressure.

FIGS. 6 and 7 are another illustration of the structure and process of the prior art Curran et al., U.S. Pat. No. 3,667,233.

Curran et al., U.S. Pat. No. 3,667,233, states at col. 1, lns. 29 et seq. that:

"A combustor with a fixed geometry has one parallel combustion section with a substantially uniform cross section along its length. Fuel is injected into this section and the flame is stabilized on recessed flameholders. As the fuel burns it causes choked flow in this section which sends a shock wave upstream to convert the normal supersonic flow through the combustor to subsonic flow. For transition from subsonic mode to the supersonic mode, fuel is injected into a diverging section upstream of the parallel section which causes the shock to move downstream until it is ejected from the engine. In the final transition to supersonic mode, fuel is supplied only to the upstream injectors."

Further, Curran et al., U.S. Pat. No. 3,667,233, states at col. 2, lns. 4 et seq. that:

"At these speeds fuel is supplied to nozzles 36. Burning of the fuel in the uniform cross section combustion chamber 24 causes choked flow which sends a shock wave upstream of the flow to convert the supersonic flow to subsonic flow within the combustion chamber. As the speed of the aircraft increases to a speed between Mach 4 and Mach 5, fuel control 30 starts a flow of fuel to nozzles 32 as the fuel control 34 gradually decreases the fuel flow to nozzles 36. This causes the shock wave to gradually recede as fuel to nozzles 32 is increased and fuel flow is decreased to nozzles 36. At a speed of about Mach 8 fuel to nozzles 36 is further reduced and supersonic combustion now occurs throughout the divergent and parallel ducts. The expansion of the heated gases in expansion section 22 permits higher Mach speeds to be attained."

The cross-sectional area of the thermal throat must increase as flight Mach number decreases, unless fuel-to-air ratio is reduced. For a given duct, this effect determines the minimum flight Mach number for dual-mode operation. At Mach 2.5, the required thermal throat area approaches that of the inlet capture area. The primary technical challenges in practical application of the dual-mode scramjet scheme of Curran et al., U.S. Pat. No. 3,667,233, are modulation of the thermal throat location, modulation of fuel distribution, ignition, and flame-holding in the large cross-section. Any in-stream devices must be retractable or expendable so as not to inhibit supersonic combustion operation.

Curran et al., U.S. Pat. No. 3,667,233, controls fuel flow to modulate the position of the thermal throat at low flight Mach numbers and then, subsequently, to transition to supersonic ramjet operation. If Curran doesn't modulate the position of the choked flow correctly, the shock wave moves further upstream into the inlet passage 21 of Curran and un-start of the engine may occur.

FIG. 6 shows a cross-sectional view 600 of a prior art (Curran et al.) scramjet engine operating in the scramjet mode. Processes that govern scramjet efficiency are inlet momentum losses, Rayleigh losses due to heat addition, heat loss to the combustor walls, skin friction, and non-equilibrium expansion. Other factors that must be considered include separation of boundary layers due to adverse pressure gradients, intense local heating at re-attachment points and shock impingements, and fuel staging or variable geometry to accommodate the variation of combustion area ratio with free stream stagnation enthalpy.

Referring to FIG. 6, fuel injection nozzle 601, inlet contraction section 602, diverging supersonic combustion section 603, and exit nozzle 604 are illustrated. As stated above, in the scramjet mode, this engine is fed with fuel injector 601. Reference numeral 608 illustrates and internal wall of the engine. Reference numeral 606 signifies incoming air being compressed. Reference numeral 605 represents the fuel-air mixture being combusted. And, reference numeral 607 signifies expanded gas/combustion products being expelled from the engine.

FIG. 7 is the cross-sectional view 700 of FIG. 6 (Curran et al. prior art engine) in the ramjet mode illustrating choked flow 702 and a shock waves 701. Fuel injectors 703, 704 are illustrated and are operable in the ramjet mode. Curran et al. must delicately control the insertion of fuel. First, fuel is inserted with injectors 703, 704 and then fuel is inserted using injector 601 to prevent the shock wave from being expelled leftwardly into the inlet contraction section 602 which may result in un-start of the engine. Reference numeral 606A indicates incoming compressed air and reference numeral 607A represents combustion products expelled from the engine.

SUMMARY OF THE INVENTION

The supersonic free jet mode of a new combined-cycle combustor is disclosed herein at various scramjet flight Mach numbers including 5, 8, and 12. The dual-mode combustor has the ability to operate in ramjet mode to lower flight Mach numbers than current dual-mode scramjets, thereby bridging the gap between turbine or rocket-based low speed propulsion and scramjets.

One important feature of the invention is the use of an unconfined free jet for supersonic combustion operation at high flight mach numbers. The free-jet traverses a larger combustion chamber that is used for subsonic combustion operation at lower flight Mach numbers. The free-jet expands at constant pressure due to combustion and rejoins the nozzle throat contour. Recirculating flow in the combustion chamber equilibrates to a pressure slightly lower than that of the free-jet causing under-expansion features to appear in the free-jet. The free-jet joins the nozzle throat contour with little interaction and expands through the nozzle expansion section.

At scramjet flight Mach numbers from 5 to 12, the supersonic free jet traverses the combustion chamber and rejoins the nozzle contour at the combustor exit. Periodic wave structure occurs in the free-jet and is initiated by an entry interaction caused by pressure mismatch and rapid mixing and combustion at the combustion chamber entrance and upstream in the inlet section. The periodic nature of the free-jet also led to an exit interaction determined by the phase of the wave structure with respect to the throat location. The effect of reducing nozzle throat area was to increase the combustion chamber pressure, and reduce the period of the wave structure, but not its amplitude. A viscous loss due to momentum transfer to the recirculation zone is also apparent in each case.

Calculated heat loads were commensurate with previous estimates for air breathing systems. Peak heat flux occurred upstream of the throat at an impingement point separating the free-jet from recirculation zone. For a given wall temperature, heat load depends on the recirculation zone temperature and volume, the severity of the exit interaction, and the fuel injection scheme.

The new combustor is disclosed for use over a wide range of flight Mach numbers, operating in both subsonic and supersonic combustion modes. It operates as a conventional ramjet at low speed, eliminating the aforementioned issues with dual-mode operation. Transition to supersonic combustion in a free-jet mode occurs at the appropriate flight condition upon the rapid opening of the nozzle throat.

A supersonic combustion ramjet engine is disclosed and claimed. The terms supersonic combustion ramjet engine, supersonic combustion ramjet and dual-mode combustor are used interchangeably herein. The supersonic combustion ramjet engine is operable in a ramjet mode and a scramjet mode. The ramjet mode extends from about flight Mach number 2.5 up to about flight Mach number 6. The scramjet mode extends from about flight Mach number 5 up to about flight Mach number 12. An inlet passageway receives compressed combustion air from a supersonic diffuser. The inlet passageway includes a fuel injector. A subsonic diffuser and a combustion chamber follow the inlet passageway. The subsonic diffuser (sometimes referred to herein as the diffusion section) includes an inner periphery. A radial step is interposed between and links the inlet passageway and the diffusion section.

The inlet passageway is in communication with the diffusion section and the diffusion section is in communication with the combustion chamber. A ramjet-mode flame holder array is located between the subsonic diffuser and the combustion chamber. The flame holder array includes a central circular aperture therethrough. The flame holders are affixed to the inner periphery of the combustion chamber.

The engine also includes a contraction section, a variable nozzle throat and an expansion section. The combustion chamber is in communication with the nozzle contraction section and the nozzle contraction section is in communication with the variable nozzle throat. And, the variable nozzle throat is in communication with the expansion section.

A nozzle positioner drives and moves the arc section forming the variable nozzle throat to a desired diametrical opening according to an algorithm which is a function of flight Mach number and combustor mode. The algorithm has a discontinuity at a given flight mach number transitioning from the ramjet mode to the scramjet mode forming a free jet from the inlet section, through the subsonic combustion chamber and reattaching at the variable nozzle throat. The ramjet mode includes subsonic operation from about flight Mach number 2.5 up to about flight Mach number 5.0 to 6.0. The scramjet mode includes supersonic operation from about flight Mach number 5.0 to 6.0 up to about flight Mach number 12.0 and greater. The nozzle positioner divergingly adjusts the nozzle throat to a relatively larger diameter between about flight Mach number 5.0 to 6.0 transitioning from the ramjet mode to the scramjet mode forming a free jet extending from the inlet section at the location of the radial step to the variable nozzle throat. The free-jet does not engage the subsonic diffuser. Nor does the free jet engage the combustion chamber. The free-jet rejoins the variable nozzle throat.

A supersonic diffuser is used to compress combustion air into a combustion air passageway. Fuel is injected from the combustion air passageway into the combustion air in the combustion air passageway creating a stoichiometric fuel-air mixture. In the scramjet mode, the stoichiometric fuel-air mixture is fed from the combustion air passageway into a free jet that traverses the subsonic diffuser. Operation in the scramjet mode is premised on previous operation and ignition in the ramjet mode using flame holders in the subsonic diffuser.

In ramjet mode, fuel is in injected from the combustion air passageway. In the ramjet mode, the fuel-air mixture is combusted in the combustion chamber. The combusted fuel-air mixture is evacuated from the combustion chamber and into the variable area nozzle throat. The variable nozzle throat is modulated and positioned according to an algorithm creating and controlling the position of a terminal shock in the subsonic diffuser. The algorithm is a function of flight Mach number.

The step of discontinuing operation of the igniters, and the step of modulating and positioning a variable nozzle throat according to an algorithm, includes transitioning, using the algorithm, the dual-mode combustor from a ramjet mode to a scramjet mode by rapidly opening the variable nozzle throat at a specified flight Mach number. The algorithm includes a discontinuity where there are two values for a specified flight mach number and it is this discontinuity, and the action based upon it, which shifts the dual-mode combustor from the ramjet mode to the scramjet mode. Shifting from the scramjet mode to the ramjet mode is also possible.

The algorithm includes the variable nozzle position as a ratio A/Ac of the actual nozzle throat area, A, to the inlet capture area, Ac, of the supersonic diffuser. The nozzle position varies from a ratio of about 0.8=A/Ac at about flight Mach number 2.5 in the ramjet mode to a ratio of about 0.18=A/Ac at about flight Mach number 5.0 in the ramjet mode. The nozzle position varies rapidly from a ratio of about 0.18=A/Ac at about flight Mach number 5.0 in the ramjet mode to a ratio of about 0.41=A/Ac at about flight Mach number 5.0 transitioning to the scramjet mode. Thereafter, the nozzle position varies from about 0.41=A/Ac at flight Mach number 5.0 in the scramjet mode to a ratio of about 0.15=A/Ac at about flight Mach number 12 in the scramjet mode.

In the scramjet mode, the fuel-air mixture and the combustion products are separated into a free-jet beginning at the exit of the combustion air passageway/radial step and extends to the variable nozzle throat. The free jet does not engage the subsonic diffuser, the combustion chamber or the contraction section.

BRIEF DESCRIPTION OF THE DRAWINGS

FIG. 3 is a prior art drawing from Curran U.S. Pat. No. 3,667,233 and, in particular, is a schematic diagram partially in block form showing an annular configuration for the combustion chamber of FIG. 1.

FIG. 4 is a prior art drawing from Curran U.S. Pat. No. 3,667,233 and, in particular, is a schematic end view of the device of FIG. 3 from the exhaust end.

FIG. 5 is a prior art drawing from Curran U.S. Pat. No. 3,667,233 and, in particular, is a schematic diagram partially in block form of a modified fuel supply system for the device of FIG. 1.

FIG. 6 is another cross-sectional view of the prior art Curran device operating in scramjet mode.

FIG. 7 is the cross-sectional view of FIG. 6 in the ramjet mode illustrating choked flow and a shock wave.

FIG. 8 is a perspective view of the dual-mode combustor in the ramjet mode.

FIG. 8A is a cross-sectional schematic view of the dual-mode combustor of FIG. 8 in the ramjet mode.

FIG. 8B is a quarter-sectional schematic view of the dual-mode combustor of FIG. 8 in the ramjet mode.

FIG. 8C is an enlargement of a portion of FIG. 8B illustrating, diagrammatically, the step between the inlet cylinder and the subsonic diffuser.

FIG. 9A is a cross-sectional schematic view of the dual-mode combustor of FIG. 9 in the scramjet mode illustrating the free-jet extending from the inlet cylinder to the variable nozzle throat.

FIG. 9B is a quarter-sectional schematic view of the dual-mode combustor of FIG. 9 in the scramjet mode.

FIG. 12 B is a control system for positioning the variable (geometric) nozzle throat.

FIG. 22A illustrates the static pressure ratio for scramjet mode flight Mach number 8 with the variable nozzle throat positioned at 110% of the design operating point.

FIG. 22B illustrates the static pressure ratio for scramjet mode flight Mach number 8 with the variable nozzle throat positioned at 100% of the design operating point.

FIG. 22C illustrates the static pressure ratio for scramjet mode flight Mach number 8 with the variable nozzle throat positioned at 90% of the design operating point.

FIG. 22D illustrates the static pressure ratio for scramjet mode flight Mach number 8 with the variable nozzle throat positioned at 80% of the design operating point.

DESCRIPTION OF THE INVENTION

In the design of the dual-mode combustor all processes were assumed adiabatic. Air capture, inlet contraction ratio, and total pressure recovery were specified as a function of flight Mach number illustrated in FIG. 12A. These characteristics are representative of a single-cone, axi-symmetric inlet design with forebody pre-compression. Air was assumed to be a mixture of nitrogen and oxygen at 78.85% and 21.15% by volume, respectively.

In the analysis of all ramjet cases, ethylene fuel entered at sonic velocity, normal to the propulsion axis at 5180 R. The energy required to raise the ethylene fuel to this condition was ignored. Constant-area combustion in a cross-sectional area equal to 83.3% of the inlet capture area was assumed. This area was chosen to allow operation at a minimum flight Mach number of 2.5 without thermal choking. For comparison, calculations were also done assuming a thermally-choked combustion process. For these cases, the diffuser exit Mach number was set to result in a combustion area ratio of 1.5.

The AIAA (American Institute of Aeronautics and Astronautics), paper entitled Supersonic Free-Jet Combustion in a Ramjet Burner, by Charles J. Trefny and Vance F. Dippold III, NASA Glenn Research Center, Cleveland, Ohio, 44135 was published and presented on Jul. 26, 2010 is incorporated herein by reference hereto.

Figure 1:
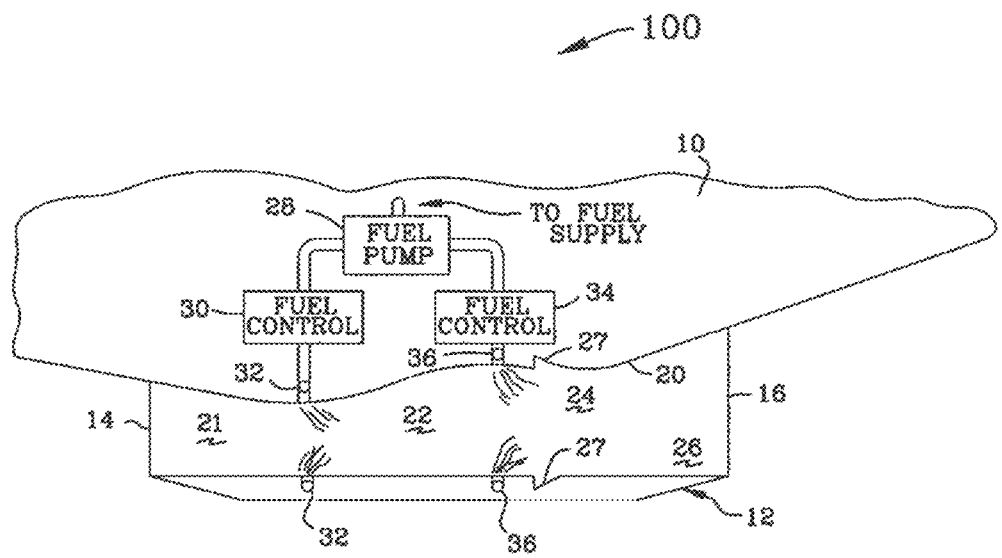
FIG. 1 is a prior art drawing from Curran U.S. Pat. No. 3,667,233 and, in particular, is a schematic diagram partially in block form of a dual mode combustion chamber according to the invention.
Figure 2:
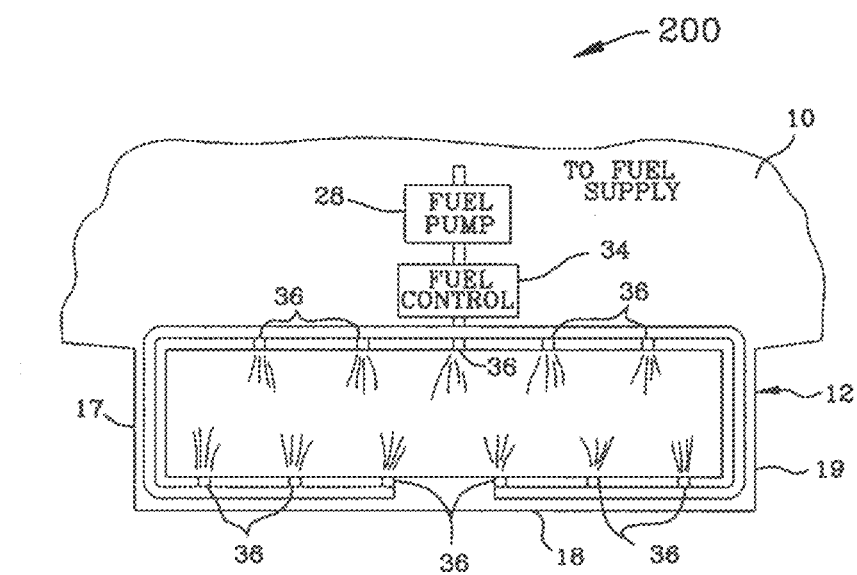
FIG. 2 is a prior art drawing from Curran U.S. Pat. No. 3,667,233 and, in particular, is a schematic cross section of the device of FIG. 1 showing one possible arrangement of the fuel inlet jets.
Figure 9:
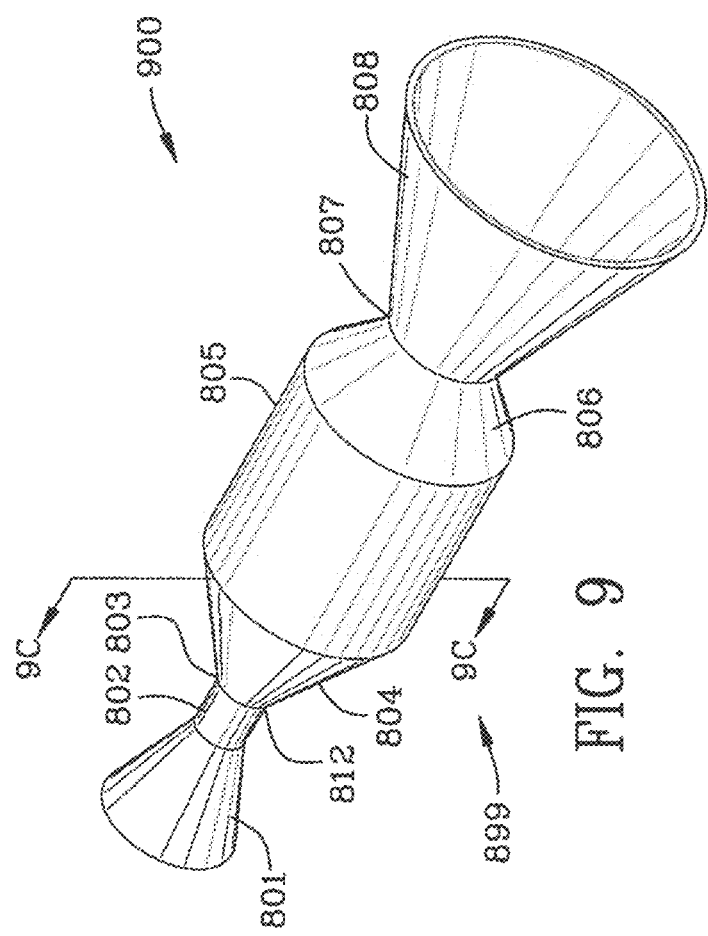
FIG. 9 is a perspective view of the dual-mode combustor in the scramjet mode.

The dual-mode combustor is illustrated in FIGS. 9, 9A and 9B in scramjet mode wherein supersonic combustion in an unconfined free-jet 943 traverses a larger subsonic combustion chamber 805, a contraction section 806, and a variable nozzle throat 807. FIG. 9 is a perspective view 900 of the dual-mode combustor in the scramjet mode. FIG. 9A is a cross-sectional schematic view 900A of the dual-mode combustor 899 of FIG. 9 in the scramjet mode illustrating the free-jet 943 extending from the inlet cylinder 802 to the variable nozzle throat 807 which yields a nozzle throat diameter D1. Nozzle throat diameter D1 as illustrated in FIG. 9A is larger than nozzle throat diameter D illustrated in FIG. 8A. The nozzle throat area is dictated by the curves illustrated in FIG. 12 for both the ramjet and the scramjet. The examples of nozzle position 807 given here for the ramjet and the scramjet are the portions of the curves 1202, 1205 where FIG. 8A ramjet mode uses a smaller nozzle throat area than FIG. 9A (scramjet mode).

Figure 9C:
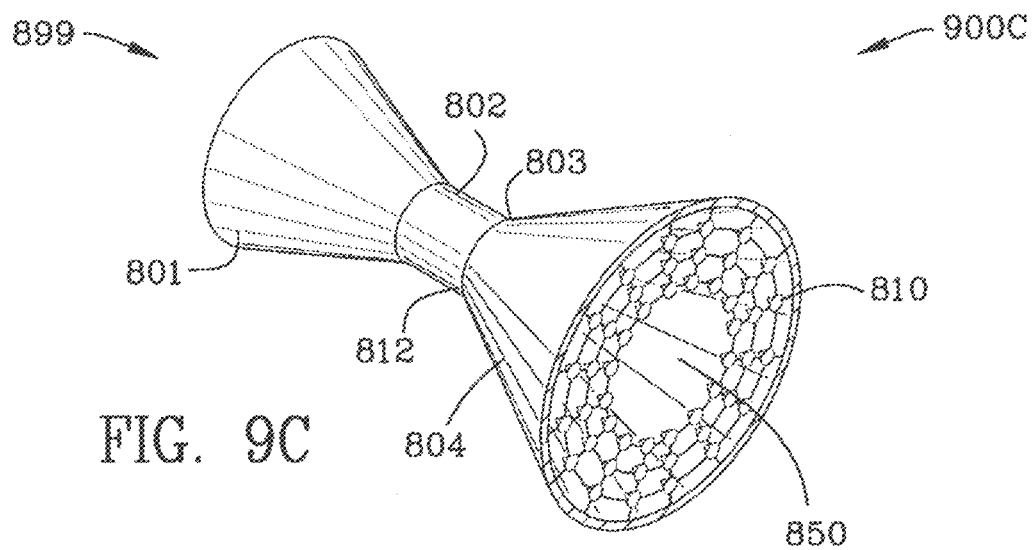
FIG. 9C is a sectioned view of the dual-mode combustor of FIG. 9 illustrating the flame-holder having a central aperture therein for the passage of the free-jet.

FIG. 9B is a quarter-sectional schematic view 900B of the dual-mode combustor of FIG. 9 in the scramjet mode. In the scramjet mode, reference numeral 845A signifies supersonic combustion and reference numeral 847A represents expansion. FIG. 9C is a sectioned view 900C of the dual-mode combustor of FIG. 9C illustrating the flame-holder 810 having a central aperture 850 therein for the passage of the free jet 943 there through.

During scramjet mode, of operation, the propulsive stream 943 is not in contact with the combustor walls 805, and equilibrates 943A to the combustion chamber pressure 944. Boundary 943A represents the interface of the free-jet/propulsive stream 943 with the recirculation zone/combustion chamber pressure 944. Thermodynamic efficiency is similar to that of a traditional scramjet, under the assumption of constant-pressure combustion. Qualitatively, a number of possible benefits exist. Fuel staging is eliminated since the cross-sectional area distribution required for supersonic combustion is accommodated aerodynamically without regard for wall pressure gradients and boundary-layer separation because the free-jet does not touch the walls of the diffuser and the combustion chamber. Variable exit diameter D1 must be set to the proper size for a given flight Mach number. The axial distance available for supersonic mixing and combustion includes the subsonic diffuser 804, combustion chamber 805 and nozzle contraction sections 806 required for ramjet operation. Heat loads, especially localized effects of shock-boundary-layer interactions, are reduced. Reference numeral 880 signifies incoming air being compressed and reference numeral 881 signifies exiting combustion gases.

FIG. 8 is a perspective view 800 of the dual-mode combustor 899 in the ramjet mode. FIG. 8 illustrates the frustoconical inlet contraction section 801, the cylindrical inlet passageway 802, the diffuser section 804, the combustion chamber 805, the contraction section 806 and the variable diameter nozzle throat 807. Reference numeral 807 signifies the variable nozzle throat at the joining point of the contraction section 806 and the expansion section 808 in the ramjet mode. In the scramjet mode, reference numeral 807 also signifies the variable nozzle throat at the joining point of the contraction section 806 and the expansion section 808.

FIG. 8A is a cross-sectional schematic view 800A of the dual-mode combustor 899 of FIG. 8 in the ramjet mode. FIG. 8A illustrates substantial differences in construction when compared to Curran U.S. Pat. No. 3,667,233. First, the flame holders 810 are arranged so as to not obstruct the free-jet as illustrated in FIG. 9A. The flame holders 810 have a central, circular aperture 850 therein. Reference numeral 810A signifies the flame holders in operation. Reference numeral 830 represents a terminal shock wave and its location as illustrated diagrammatically in FIG. 8A is important. Location of the terminal shock wave 830 in the ramjet mode is important and is controlled by the position of the nozzle throat 807 diameter D. Reference numeral 872 signifies heat release within the combustor.

There is no thermal throat in the dual-mode combustor 899 because the variable nozzle throat 807 is positioned so as to control the terminal shock wave 830.

Figure 12:
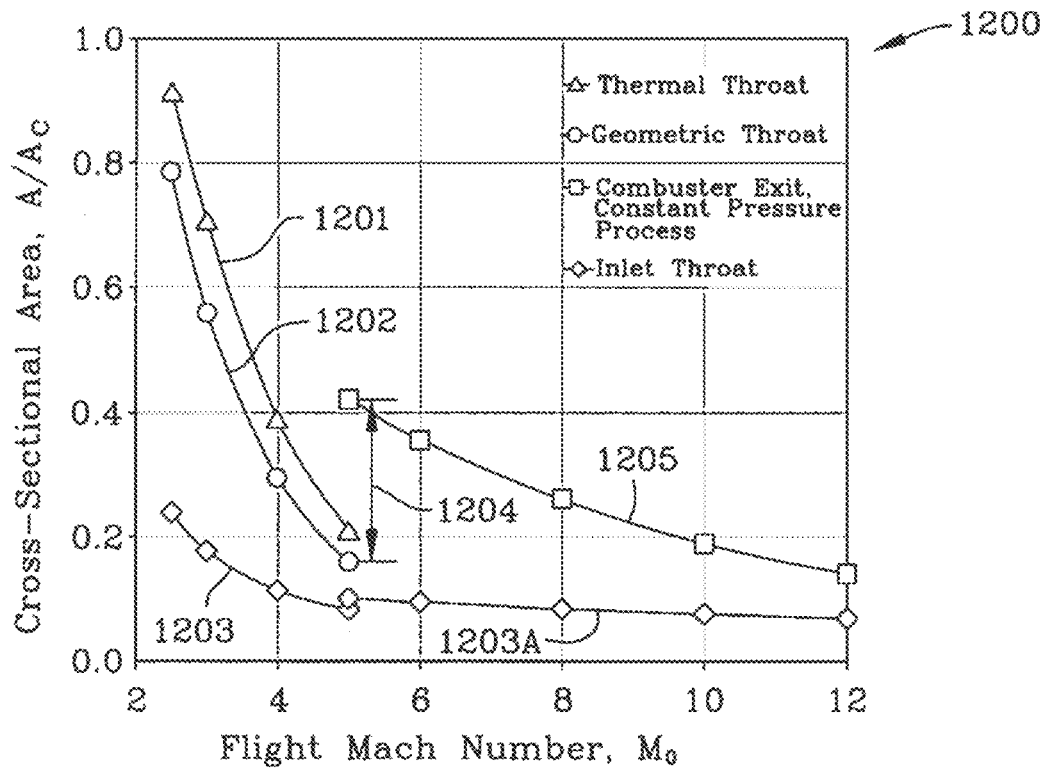
FIG. 12 is a plot of the prior art thermal throat of Curran, the geometric/nozzle throat of the dual-mode combustor in ramjet mode and in scramjet mode, and the inlet diameter of the dual-mode combustor as a function of the inlet capture area.
Figure 12A:
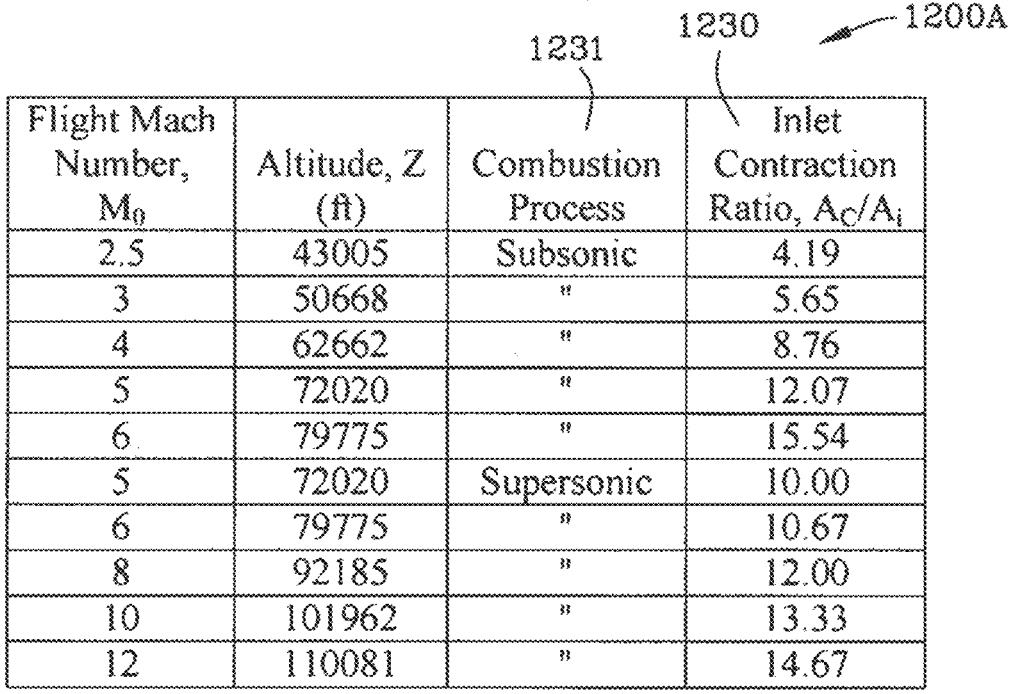
FIG. 12A is a table of inlet contraction ratios as a function of the inlet capture area for a range of flight Mach numbers.

FIG. 12 is a plot 1200 of the prior art thermal throat of Curran 1201, the geometric/nozzle throat 1202 of the dual-mode combustor 899 in ramjet mode, the geometric/nozzle throat 1205 in scramjet mode, and the inlet throat 1203, 1203A of the dual-mode combustor 899 as a ratio of A/A capture area. FIG. 12A is a table 1200A of inlet contraction ratios 1231 as a ratio ((A/A capture area) 1231) for a range of flight mach numbers and combustion processes 1230. FIG. 12 B is a control system 1200B for positioning the variable (geometric) nozzle throat 807. FIG. 12 indicates a discontinuity or jump 1204 between the ramjet mode plot 1202 and the scramjet mode plot 1205.

A nozzle positioner 1212 drives and moves the arc section 1125 forming the nozzle throat 1108, to a desired diametrical opening according to an algorithm (FIG. 12 curves, 1202, 1205) which is a function of flight Mach number and combustor mode (ramjet or scramjet). The algorithm has a discontinuity at a given flight mach number, in this example, flight Mach number 5.0, transitioning from the ramjet mode to the scramjet mode forming a free-jet 943 from the inlet section 802, through the subsonic diffuser 804, through the combustion chamber 805, through the contraction section, and rejoins the nozzle throat 807 (diameter D1). The ramjet mode includes subsonic operation from about flight Mach number 2.5 up to about flight Mach number 5.0 to 6.0 and the cross-sectional area of the nozzle throat 807 divided by the inlet capture area, A inlet capture area, should follow curve 1202.

The scramjet mode includes supersonic operation from about flight Mach number 5.0 to 6.0 up to about flight Mach number 12.0 and greater. The nozzle positioner divergingly adjusts the nozzle throat diameter (nozzle area) rapidly to a relatively larger diameter between about flight Mach number 5.0 to 6.0 rapidly transitioning from the ramjet mode to the scramjet mode forming a free-jet 943 extending from the inlet section 802 at the location of the radial step 812, 812A to the nozzle throat 807. The free-jet does not engage the subsonic diffuser 804. Nor does the free-jet 943 engage the combustion chamber 805. The free-jet 943 rejoins the nozzle throat 807 as illustrated in FIG. 9A.

Referring to FIG. 8A and FIG. 12, reference numeral 1201 indicates the algorithm for the position of the nozzle throat 807 (diameter D) as a ratio of the inlet capture area (area=A inlet capture area). Specifically, the nozzle throat area must be positioned on the line 1202 for ramjet mode operation for flight numbers between 2.5 to 5.0. Further, the nozzle throat 807 (diameter D1) in the scramjet mode must be positioned on the line 1205 for the scramjet mode operation for flight numbers between 5.0 and 12.0. Reference numeral 1204 represents the transition between the ramjet mode (pursuant to curve or algorithm 1202) and the scramjet mode (pursuant to curve or algorithm 1205). Operation between the modes is switched back and forth between the curves 1202, 1205.

Referring to FIG. 8A and FIG. 12, the location of the shock wave 830 is important. If the nozzle throat area ratio is positioned below the line 1201 in FIG. 12, the engine will un-start as the shock wave moves leftwardly and is expelled from the engine in order to spill air around and past the inlet capture area. Similarly, if the nozzle throat area ratio is positioned above the line 1202 in FIG. 12, the engine may prematurely transition to the scramjet mode if the flight Mach number is sufficiently high. Transition to the scramjet mode is accomplished by rapidly changing the nozzle throat ratio (A/A inlet capture area) from curve 1202 to curve 1205 in combination with radially oriented step 1203 which causes the free-jet to separate from the diffuser surface and the combustion chamber. The flame holders 810 have no function.

FIGS. 12 and 12A also indicate that the diameter of the cylindrical inlet 802 changes as a function of ramjet mode (see curve 1203), and also cylindrical inlet 802 changes as a function of scramjet mode (see curve 1203A). FIG. 12A indicates that the inlet contraction ratio (A inlet capture area/A inlet cylinder) increases as flight Mach number increases in the ramjet mode up to about flight Mach number 6.0. Further, FIG. 12A indicates that the inlet contraction ratio increases as flight Mach number increases in the scramjet mode up to about flight Mach number 12.0. FIG. 12 reference numerals 1203, 1203A represent the inverse of this data, in other words, the inlet throat diameter ratios (A inlet cylinder/A capture area) are the inverse of the previously defined contraction ratio.

As a general rule the nozzle throat 1202 and the inlet throat 1203 decrease with increasing flight Mach number in ramjet mode. Similarly, as a general rule the geometric/nozzle throat 1205 and the inlet throat 1203A decrease with increasing flight Mach number in scramjet mode.

Cycle analysis was performed over the flight Mach number range of 2.5 to 12 at a dynamic pressure of 1500 psfa in order to establish the variable geometry requirements for the inlet area and nozzle throat area. For supersonic combustion cases, a constant-pressure combustion process was assumed with ethylene fuel entering at sonic velocity, parallel to the propulsion axis at the diffuser exit static pressure and 10000 R.

FIG. 12 presents the variation of inlet and nozzle throat areas with flight Mach number for various operating modes. Of primary interest is the large variation in nozzle throat area required in the low flight Mach number range. The dual-mode ramjet's thermal throat area must vary by a factor of 4.5 from Mach 2.5 to 5. The required throat area variation for the conventional ramjet is slightly less over the same range. The thermally-choked cases require a larger throat area at a given flight Mach number because of the greater total pressure loss associated with the transonic combustion process. In the dual-mode engine, the axial location of combustion in a diverging flow path is varied. The fuel distribution and flame-holding mechanisms used for axial modulation of the heat release must not interfere with scramjet-mode operation. These are the fundamental issues associated with extension of the dual-mode to low Mach number flight. Also shown in FIG. 12 is the inlet throat area variation representative of the contraction ratio. Finally, the combustor-exit area variation as a result of constant-pressure supersonic combustion is shown in FIG. 12, and represents the free-jet combustor nozzle throat area design values.

The area ratio due to combustion of the propulsive stream decreases with flight Mach number as the incoming energy increases. A factor of 2.5 reduction in nozzle throat area is required between Mach 5 and 12. For all modes of operation, the required variations in throat area shown are a function of the inlet mass capture and pressure recovery characteristics assumed, and while representative for the purposes herein, could be reduced by integration, or other inlet design that results in greater spillage and higher recovery at the lower end of the flight Mach number range. Nozzle throat area variation requirements could also be relieved by a reduction in fuel-air ratio at the lower flight Mach numbers at the expense of net thrust. Obviously, limiting the flight Mach number range would also diminish the variable geometry requirements.

Figure 12B:
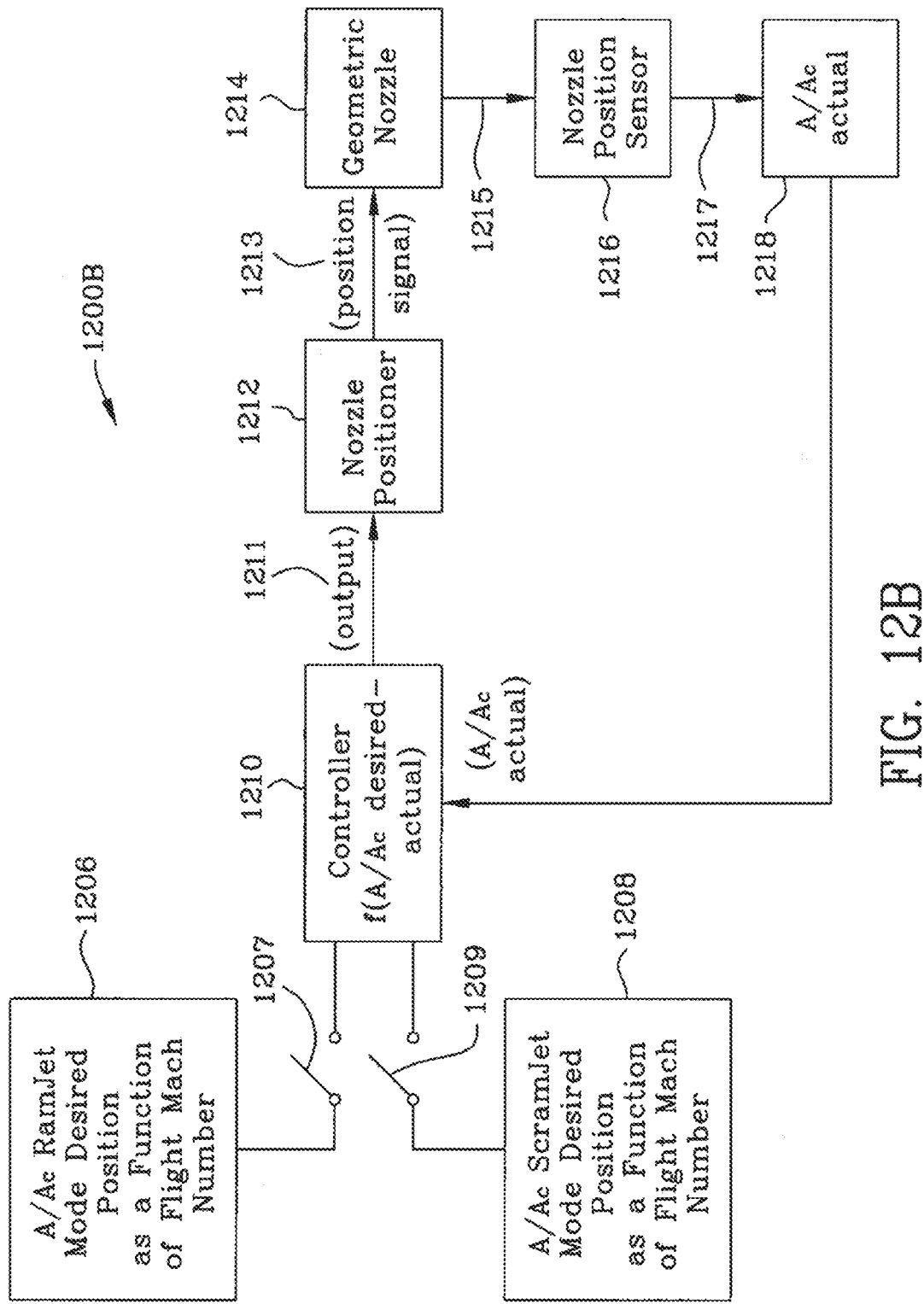

FIG. 12B is a control system 1200B for positioning the variable (geometric) nozzle throat 807. FIG. 12B illustrates desired 1206 ramjet mode (A nozzle/A inlet capture area) ratios switched into a controller 1210 when in the ramjet mode. Similarly, FIG. 12B illustrates desired 1208 scramjet mode (A nozzle/A inlet capture area) ratios switched into controller 1210 when in the scramjet mode. Controller 1210, based on any differences between desired and actual (A nozzle/A inlet capture area), outputs corrective action to the nozzle positioner 1212 which then positions 1214 the variable geometric nozzle throat. A nozzle positioner sensor 1216 in combination with interconnecting lines 1215, 1217 communicate the actual (A nozzle/A inlet capture area) signal to controller 1210 for comparison to the desired (A nozzle/A inlet capture area) pursuant to curve or algorithm 1202, 1204 and 1205.

FIG. 8B is a quarter-sectional schematic view 800B of the dual-mode combustor 899 of FIG. 8 in the ramjet. mode. Supersonic compression 841 occurs in the inlet contraction section 801 leading to the cylindrical inlet passageway 802. Arrow 842 indicates fuel injected perpendicularly to the variable diameter inlet cylindrical passageway/section 802. Multimode fuel injector 8421 injects fuel radially into passageway 802. Reference numeral 844 illustrates a region of subsonic diffusion and fuel mixing and reference numeral 845 illustrates a region of subsonic combustion. Reference numeral 846 illustrates contraction to a choked throat 807 and reference numeral 847 illustrates expansion and exhaust.

FIG. 8C is an enlargement 800C of a portion of FIG. 8B illustrating, diagrammatically, the radial step 803 between the inlet 802 cylinder and the subsonic diffuser 804. FIG. 8C also illustrates the fuel injector 8421 and the injection of fuel 842.

One of the important benefits of the dual-mode combustor 899, however, is that the combustion chamber 805 can be used for robust, subsonic combustion at low flight Mach numbers. Operation as a subsonic combustion ramjet (ramjet mode) is illustrated in FIGS. 8, 8A and 8B. Fuel injection can be accomplished with a single array of injectors upstream in the inlet section 802. Ignition and flame-holding 810 can be accomplished with an in-stream device as shown in FIGS. 8 and 9.

FIGS. 8, 8A and 8B illustrate the subsonic combustion ramjet mode. At the desired flight condition, transition to free jet mode is effected by increasing the nozzle throat 807 area suddenly and inducing separation at the radial step 803 located at the diffuser inlet. The flame-holding array 810 does not extend across the subsonic diffuser 804. In particular, the flame-holding array includes an aperture 850 therein which accommodates passage of the free-jet therethrough in the scramjet mode. The subsonic diffuser section, sometimes referred to herein as the subsonic diffuser 804, satisfies the requirements of operation as a diffuser in ramjet mode, and separated operation in free jet mode.

In free-jet mode (scramjet mode) the propulsive stream re-joins the nozzle throat section, D1, with a minimum of disruption. The combustion chamber pressure equilibrates to near that of the diffuser exit, and will depend on many factors such as the nozzle throat area, A, the rate of fuel entrainment, and the aerodynamics of the re-circulation region. Overall heat load to the combustion chamber walls depends on the temperature in the recirculation region, and the competing effects of low velocity and increased surface area.

Figure 10:
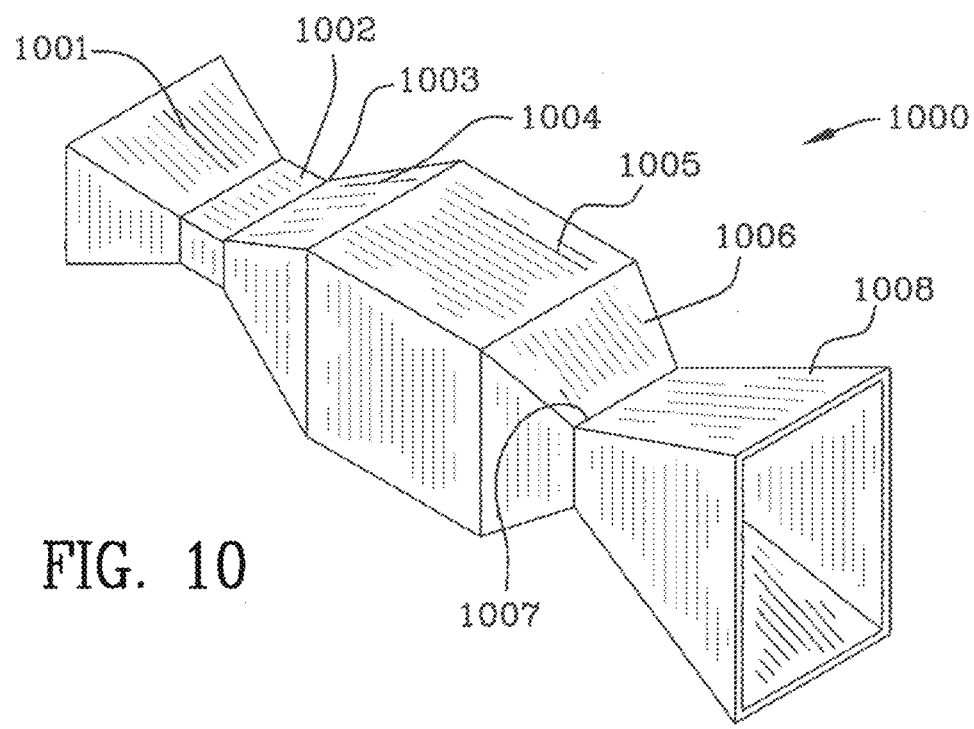
FIG. 10 is another example of the dual-mode combustor employing different geometry.

FIG. 10 is a perspective of the dual-mode combustor 1000 employing rectangular geometry. FIG. 10 illustrates inlet contraction section 1000, inlet minimum area 1002, subsonic diffuser section 1004, combustion chamber 1005, nozzle contraction section 1006, variable nozzle throat at the joining point of the contraction section 1006 and the expansion section 1007. Step 1003 and the expansion section 1008 are illustrated in FIG. 10. All components of the dual-mode combustor 1000 can vary dimensionally. In general the various components in FIG. 10 are rectangularly shaped. In this example, the nozzle throat would be rectangular and would be adjustable.

Figures 11, 11A:
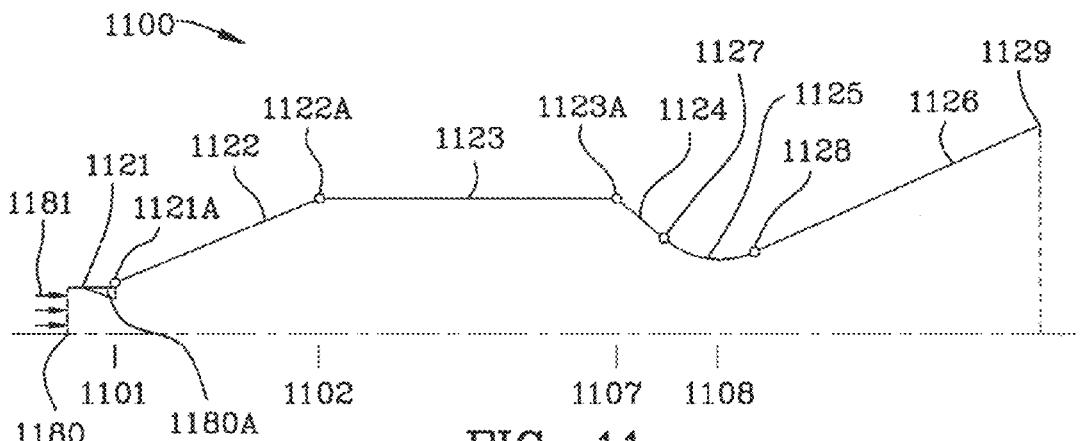
FIG. 11 is a quarter-sectional diagrammatic view of the dual mode combustor in the scramjet mode for flight mach number 8 illustrating a step, a hinged diffuser section, a fixed combustion chamber section, a hinged contraction section, a hinged nozzle throat section (circular arc section) and a hinged expansion section.
FIG. 11A is a table of values relating to FIG. 11.

FIG. 11 is a quarter-sectional diagrammatic view 1100 of the dual mode combustor 899 in the scramjet mode for flight Mach number 8 illustrating a radial step 1121A, a hinged diffuser section 1122, a hinged combustion section 1123, a hinged contraction section 1124, a hinged nozzle throat/arc section 1125 and a hinged expansion section 1126. FIG. 11A provides dimensional information 1100A relating to FIG. 11 including the radius of the engine at different stages thereof and the axial position of different stages thereof. Reference numeral 1101 represents station 1 (end of cylindrical inflow section), reference numeral 1102 represents the beginning of cylindrical combustion chamber, reference numeral 1107 represents station 7 (end of cylindrical combustion chamber), reference numeral 1108 represents station 8 (nozzle throat), reference numeral 1121 represents the cylindrical inflow chamber, reference numeral 1121A represents the hinge and aft facing step, reference numeral 1122 represents the diffuser section, reference numerals 1122A, 1123A, 1127, 1128 represent hinges, reference numeral 1123 represents the combustion chamber, reference numeral 1124 represents the contraction section, reference numeral 1125 represents the arc section, reference numeral 1126 represents exhaust section, reference numeral 1129 represents the termination of the exhaust section, reference numeral 1180 represents station zero (air inlet from air inlet contraction device), reference numeral 1180A represents the multi-mode fuel injectors, and reference numeral 1181 indicates arrows of incoming air.

Also, hinges, H, indicate herein that the geometry of the dual-mode combustor may change around these points between component sections thereof to accommodate flight conditions. Reference numerals 1127 and 1128 signify the interconnection of the arc section 1125 to the contraction section and the expansion section, respectively. In reviewing FIG. 11 tangency is maintained and required in all examples between the arc sections and the contraction and expansion sections. This means that the hinges are the equivalent of sliding joints. Specifically, although joints 1127, 1128 are illustrated diagrammatically as hinges, in fact these diagrammatic "hinges" are limited in their movement such that tangency between the contraction section and the arc section is maintained and the arc section may not bend back or extend such that a line coincident with the contraction section would intersect with the arc section 1125. Similarly, the hinges illustrated in FIGS. 13-16, inclusive, may be considered as sliding joints.

Still referring to FIG. 11, the hinges diagrammatically indicate that the geometry of the engine changes pursuant to the flight Mach number conditions. Now referring to FIG. 12A, as a general rule the geometric/nozzle throat 1202 and the inlet throat 1203 decrease with increasing flight Mach number in ramjet mode. See FIG. 12. Similarly, as a general rule the geometric/nozzle throat 1205 and the inlet throat 1203A decrease with increasing flight Mach number in scramjet mode. The axi-symmetric geometry used for the analysis consists of the fixed-length, hinged panels and cylindrical sections is shown in FIG. 11. The fixed-length cylindrical inlet section diameter varies with flight Mach number to match the contraction ratio schedule given in FIG. 12A with an allowance for fuel injection. A small radial step was placed at station 1 to facilitate flow separation. Generally the radial step is one-tenth the radius of the inlet cylinder. The cylindrical combustor section is sized to accommodate ramjet combustion for the Mach 2.5 flight condition. The nozzle throat is formed by a circular arc of radius equal to one-half that of the inlet capture area. As the required throat area varies with flight condition, the nozzle throat arc length varies such that the contraction and expansion panels maintain tangency. The expansion panel trailing edge is maintained at a fixed radius, giving an exit area equal to twice the inlet capture area. Coordinates for the Mach 8 geometry shown in FIG. 11 are given in FIG. 11A. Ethylene fuel enters axially at station 1 (1101) through injectors 1180A as illustrated in FIG. 11.

Figure 11B:
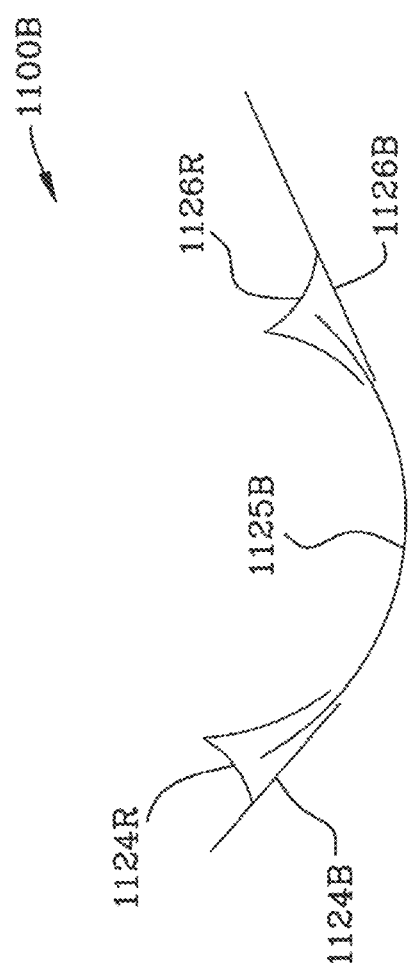
FIG. 11B is a schematic view of an example of a receiving joint forming the nozzle throat

FIG. 11B is a view of a receiving joint forming the nozzle throat. Reference numeral 1124B signifies a nozzle contraction section having a receiving joint 1125R. Reference numeral 1126B signifies a nozzle expansion section having a receiving joint 1126R-receiving. Arc section 1125B slidingly resides within joints/openings 1124R, 1126R such that the rotation of the nozzle contraction section 1124B and/or the rotation of the nozzle expansion section 1126R moves the nozzle throat 1108 while maintaining a tangential relationship between the sections 1124B, 1126E and the arc section 1125B.

Figure 13A:
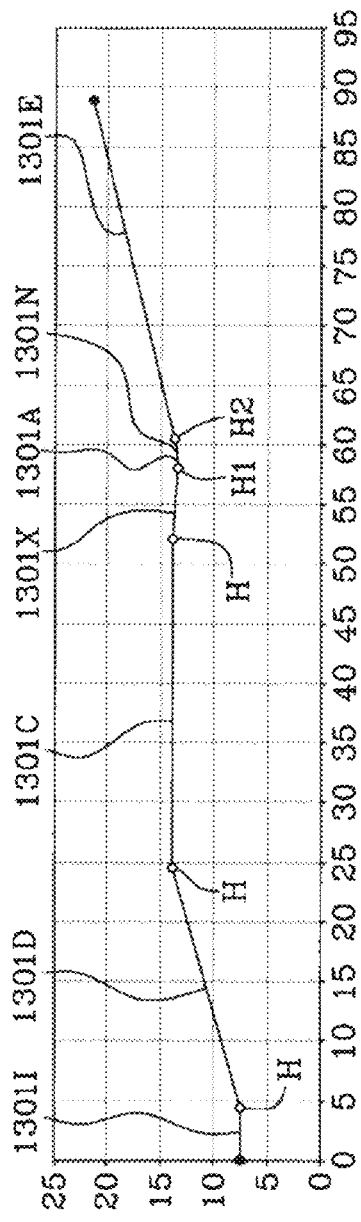
FIG. 13A is a generalized quarter-sectional diagrammatic view of the flight Mach number 2.5 ramjet.
Figure 13B:
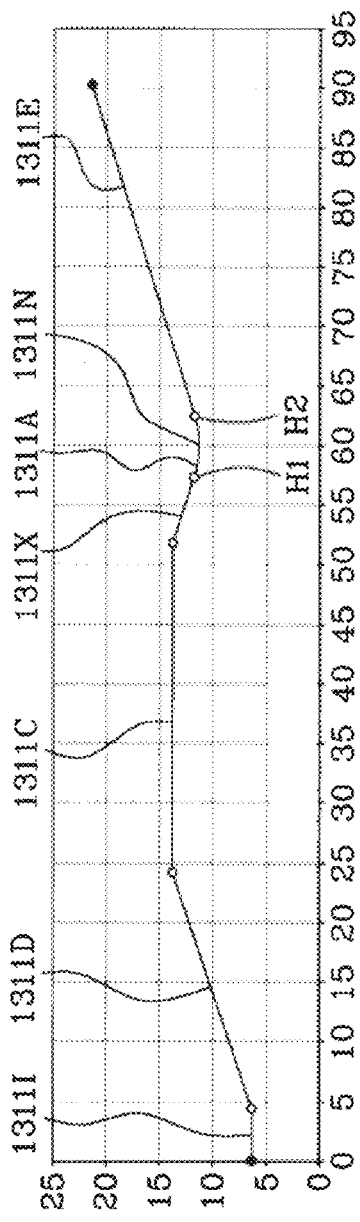
FIG. 13B is a generalized quarter-sectional diagrammatic view of the flight Mach number 3.0 ramjet.
Figure 13C:
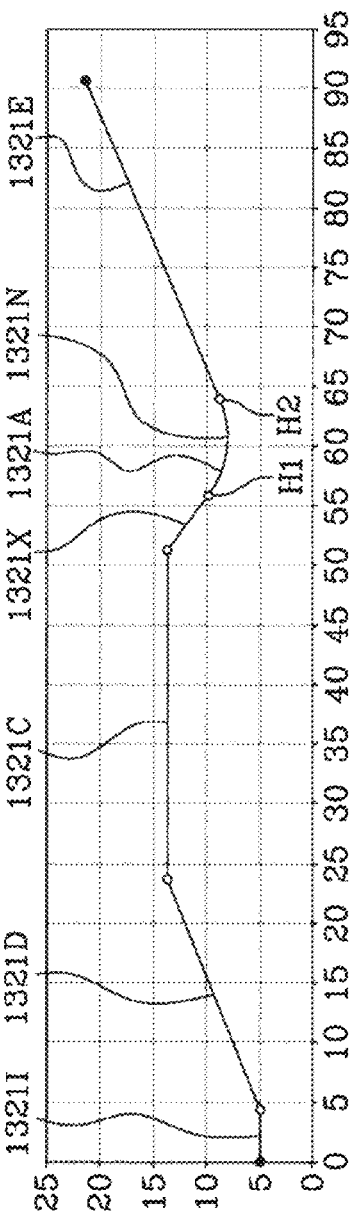
FIG. 13C is a generalized quarter-sectional diagrammatic view of the flight Mach number 4.0 ramjet.

FIG. 13A is a generalized quarter-sectional diagrammatic view 1300A of the flight Mach number 2.5 ramjet. FIG. 13B is a generalized quarter-sectional diagrammatic view 1300B of the flight Mach number 3.0 ramjet. FIG. 13C is a generalized quarter-sectional diagrammatic view 1300C of the flight Mach number 4.0 ramjet.

All numerical values in FIGS. 13A-16C, inclusive, are in inches with the radius being indicated on the ordinate ("y") axis and the axial length indicated on the abscissa ("x") axis. Also, hinges, H, indicate herein that the geometry of the dual-mode combustor may change around these pivot points between component sections thereof to accommodate flight conditions. Reference numerals H1 and H2 signify the interconnection of the arc section to the contraction section and the expansion section, respectively. In reviewing FIGS. 13A-16C, tangency is maintained and required in all examples between the arc sections and the contraction and expansion sections.

The reference numerals used in FIGS. 13A, 13B and 13C are set forth below. Reference numerals 1301I, 1131I, 1321I represent the respective inlet sections illustrated in FIGS. 13A, 13B and 13C, respectively. Reference numerals 1301A, 1311A, 1321A represent the arc sections illustrated in FIGS. 13A, 13B and 13C, respectively. Reference numerals 1301N; 1311N, 1321N represent the variable nozzle throat sections illustrated in FIGS. 13A, 13B and 13C, respectively. A review of FIGS. 13A, 13B and 13C, respectively, yields the conclusion that the inlet diametrical section, which is cylindrical, is decreasing in diameter as the flight Mach number is increasing from 2.5 to 4.0 in the ramjet mode while the nozzle throat radius is decreasing with increased flight Mach number. Tangency is maintained in all examples of FIGS. 13A, 13B and 13C between the arc sections and the contraction and expansion sections.

Figure 14A:
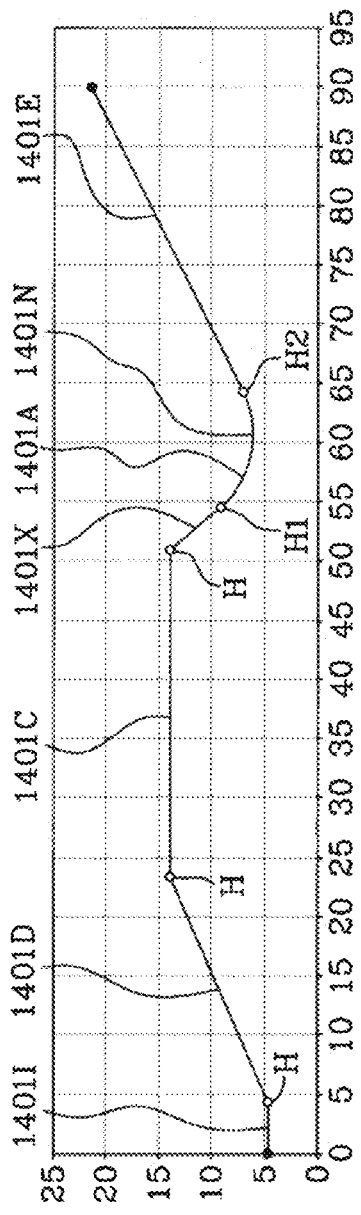
FIG. 14A is a generalized quarter-sectional diagrammatic view of the flight Mach number 5.0 ramjet.
Figure 14B:
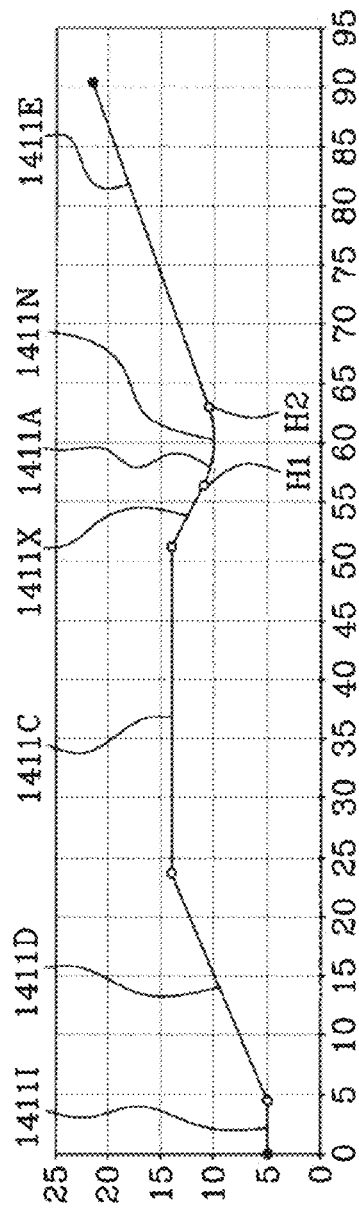
FIG. 14B is a generalized quarter-sectional diagrammatic view of the flight Mach number 5.0 scramjet.

FIG. 14A is a generalized quarter-sectional diagrammatic view 1400A of the flight Mach number 5.0 ramjet. FIG. 14B is a generalized quarter-sectional diagrammatic view 1400B of the flight Mach number 5.0 scramjet. Reference numerals 1401I, 1411I represent the respective inlet sections illustrated in FIGS. 14A and 14B, respectively. Reference numerals 1401A, 1411A represent the arc sections illustrated in FIGS. 14A and 14B, respectively. Reference numerals 1401N, 1411N represent the variable nozzle throat sections illustrated in FIGS. 14A and 14B, respectively. A review of FIGS. 14A and 14B, respectively, yields the conclusion that the inlet diametrical section, which is cylindrical, is slightly increasing in diameter as the engine is transitioning from ramjet flight Mach number 5 to scramjet flight Mach number 5 while the nozzle throat radius is substantially increasing while transitioning from ramjet flight Mach number 5 to scramjet flight Mach number 5. Tangency is maintained in all examples of FIGS. 14A and 14B between the arc sections and the contraction and expansion sections.

Figure 15A:
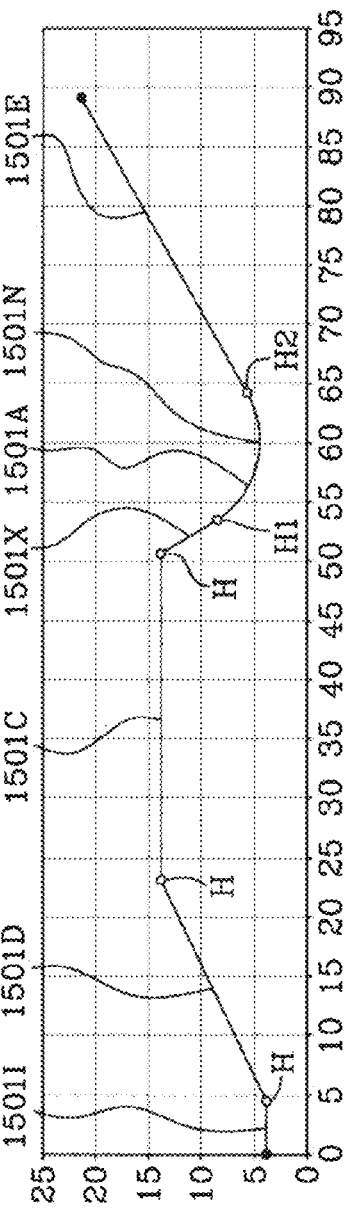
FIG. 15A is a generalized quarter-sectional diagrammatic view of the flight Mach number 6.0 ramjet.
Figure 15B:
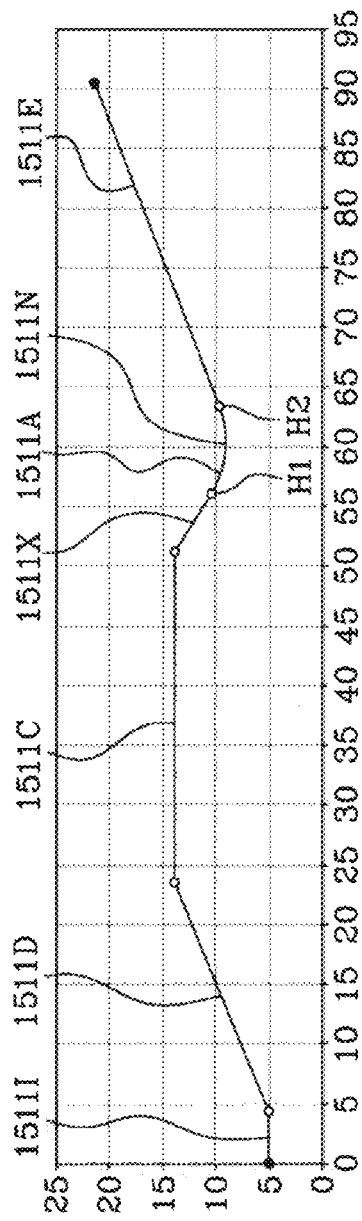
FIG. 15B is a generalized quarter-sectional diagrammatic view of the flight Mach number 6.0 scramjet.

FIG. 15A is a generalized quarter-sectional diagrammatic view 1500A of the flight Mach number 6.0 ramjet. FIG. 15B is a generalized quarter-sectional diagrammatic view 1500B of the flight Mach number 6.0 scramjet. Reference numerals 1501I, 1511I represent the respective inlet sections illustrated in FIGS. 15A and 15B, respectively. Reference numerals 1501A, 1511A represent the arc sections illustrated in FIGS. 15A and 15B, respectively. Reference numerals 1501N, 1511N represent the variable nozzle throat sections illustrated in FIGS. 15A and 15B, respectively. A review of FIGS. 15A and 15B, respectively, yields the conclusion that the inlet diametrical section, which is cylindrical, is slightly increasing in diameter as the engine is transitioning from ramjet flight Mach number 6 to scramjet flight Mach number 6 while the nozzle throat radius is substantially increasing while transitioning from ramjet flight Mach number 6.0 to scramjet flight Mach number 6.0. Tangency is maintained in all examples of FIGS. 15A and 15B between the arc sections and the contraction and expansion sections.

Figure 16A:
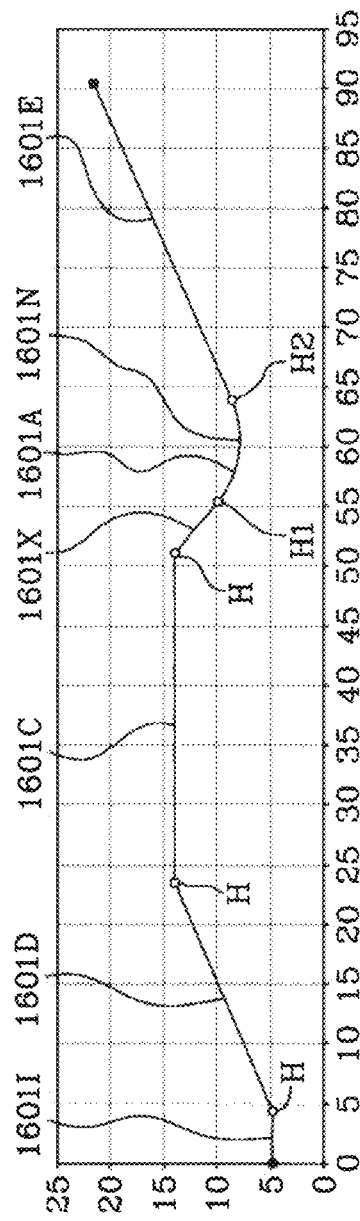
FIG. 16A is a generalized quarter-sectional diagrammatic view of the flight Mach number 8.0 scramjet.
Figure 16B:
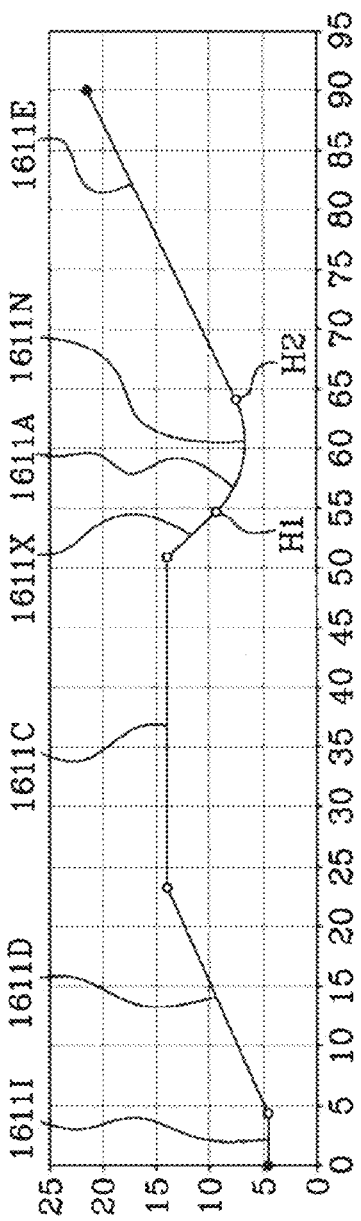
FIG. 16B is a generalized quarter-sectional diagrammatic view of the flight Mach number 10.0 scramjet.
Figure 16C:
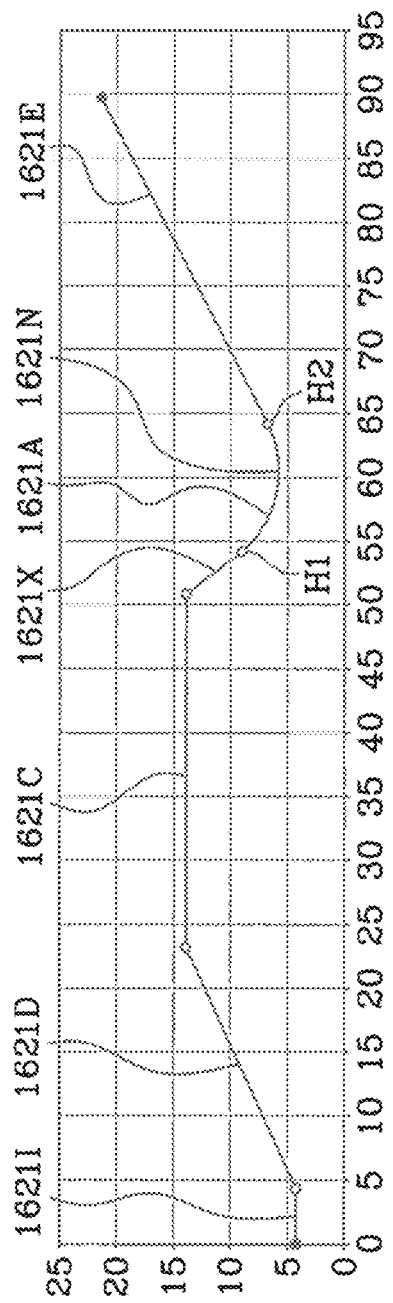
FIG. 16C is a generalized quarter-sectional diagrammatic view of the flight Mach number 12.0 scramjet.

FIG. 16A is a generalized quarter-sectional diagrammatic view 1600A of the flight Mach number 8.0 scramjet. FIG. 16B is a generalized quarter-sectional diagrammatic view 1600B of the flight Mach number 10.0 scramjet. FIG. 16C is a generalized quarter-sectional diagrammatic view 1600C of the flight Mach number 12.0 scramjet. Reference numerals 1601I, 1611I, 1621I represent the respective inlet sections illustrated in FIGS. 16A, 16B and 16C, respectively. Reference numerals 1601A, 1611A, 1621A represent the arc sections illustrated in FIGS. 16A, 16B and 16C, respectively. Reference numerals 1601N, 1611N, 1621N represent the variable nozzle throat sections illustrated in FIGS. 16A, 16B and 16C, respectively. A review of FIGS. 16A, 16B and 16C, respectively, yields the conclusion that the inlet diametrical section, which is cylindrical, is slightly decreasing in diameter as the flight Mach number is increasing from 8.0 to 10.0 in the scramjet mode while the nozzle throat radius is moderately decreasing with increased flight Mach number. Tangency is maintained in all examples of FIGS. 16A, 168 and 16C between the contraction and expansion sections.

Figure 17A:
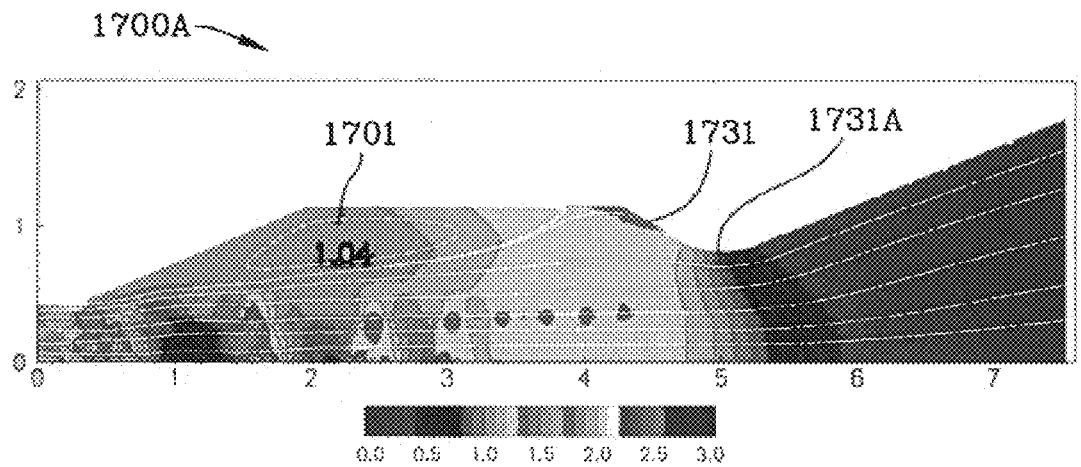
FIG. 17A is an illustration of the pressure contours within the engine for the flight Mach number 5.0 scramjet.
Figure 17B:
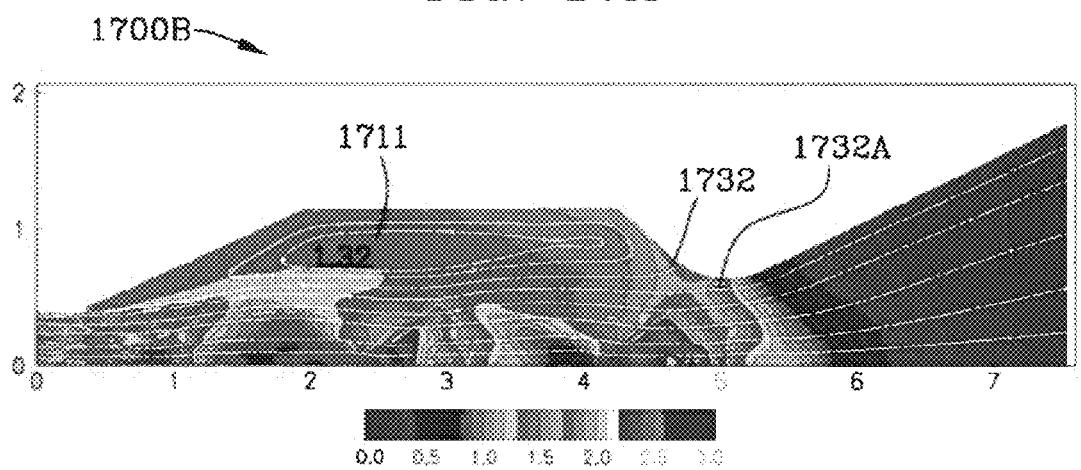
FIG. 17B is an illustration of the pressure contours within the engine for the flight Mach number 8.0 scramjet.
Figure 17C:
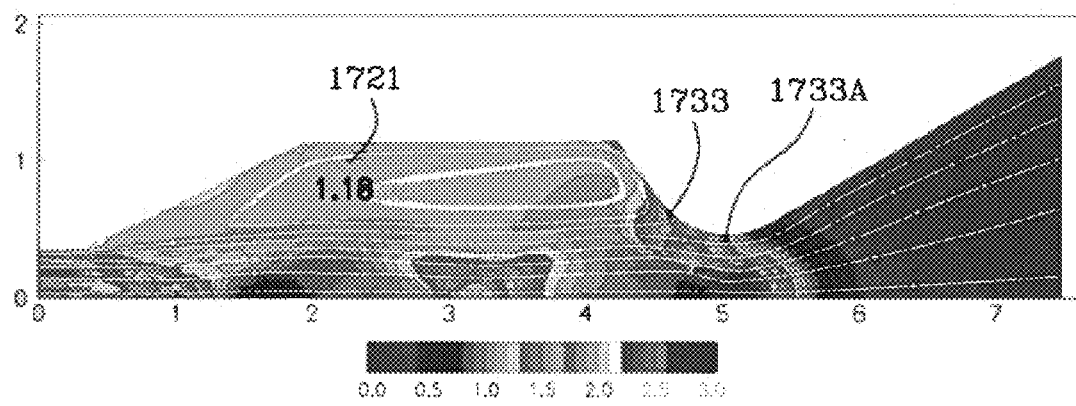
FIG. 17C is an illustration of the pressure contours within the engine for the flight Mach number 12.0 scramjet.

Contours of static pressure ratio for flight Mach numbers 5, 8 and 12 in the scramjet mode flight conditions appear in FIGS. 17A, 17B, and 17C. FIG. 17A is an illustration of the pressure contours 1700A within the engine for the flight Mach number 5.0 scramjet. FIG. 17B is an illustration of the pressure contours 1700B within the engine for the flight Mach number 8.0 scramjet. FIG. 17C is an illustration of the pressure contours 1700C within the engine for the flight Mach number 12.0 scramjet.

Referring to FIG. 17A, pressure ratio contours, P/Pinlet, for the flight Mach number 5.0 scramjet are illustrated and pressure ratio, P/Pinlet, 1701, has a magnitude of about 1.04 and is located generally in the recirculation zone, forward portion of the combustion chamber. Reference numeral 1731 is a stagnation streamline. When viewing FIG. 17A, everything leftwardly of stagnation streamline 1731 is in the recirculation zone. Reference numeral 1731A represents a free-jet streamline.

Referring to FIG. 17B, pressure ratio, P/Pinlet, 1711, for the flight Mach number 8.0 scramjet, pressure ratio has a magnitude of about 1.32 and is located generally in the recirculation zone of the forward portion of the combustion chamber. When viewing FIG. 17B, everything leftwardly of stagnation streamline 1732 is in the recirculation zone. Reference numeral 1732A represents a free-jet streamline.

Referring to FIG. 17C, pressure ratio, P/Pinlet, 1712, for the flight Mach number 12.0 has a magnitude of about 1.18 and is located generally in the recirculation zone of the forward portion of the combustion chamber. When viewing FIG. 17C, everything leftwardly of stagnation streamline 1733 is in the recirculation zone. Reference numeral 1733A represents a free jet streamline.

Reviewing FIG. 17, the recirculation zone pressure ratios increase from scramjet flight Mach number 5 to 8 and then decrease from between flight Mach number 8 to 12.

Figure 18A:
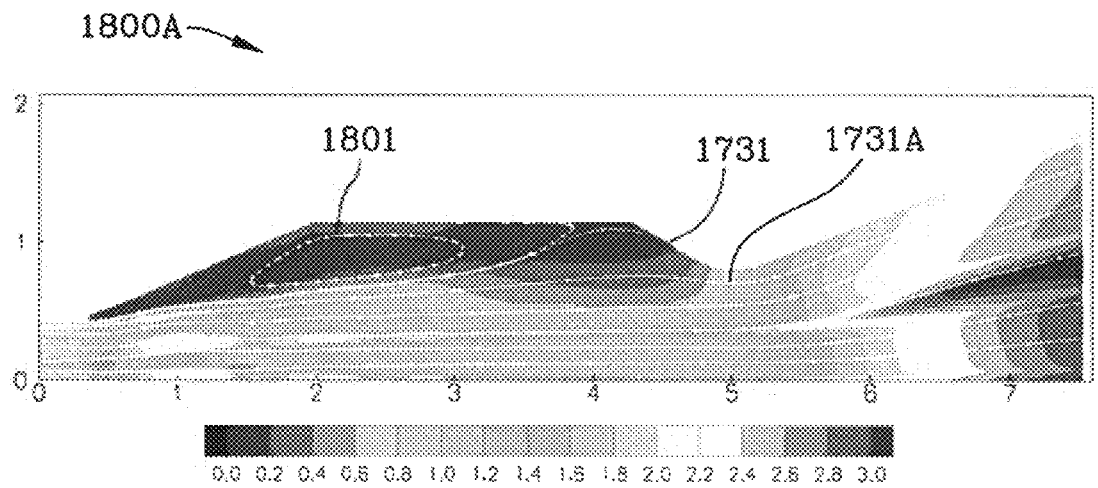
FIG. 18A is an illustration of the Mach number contours within the engine for the flight Mach number 5.0 scramjet.
Figure 18B:
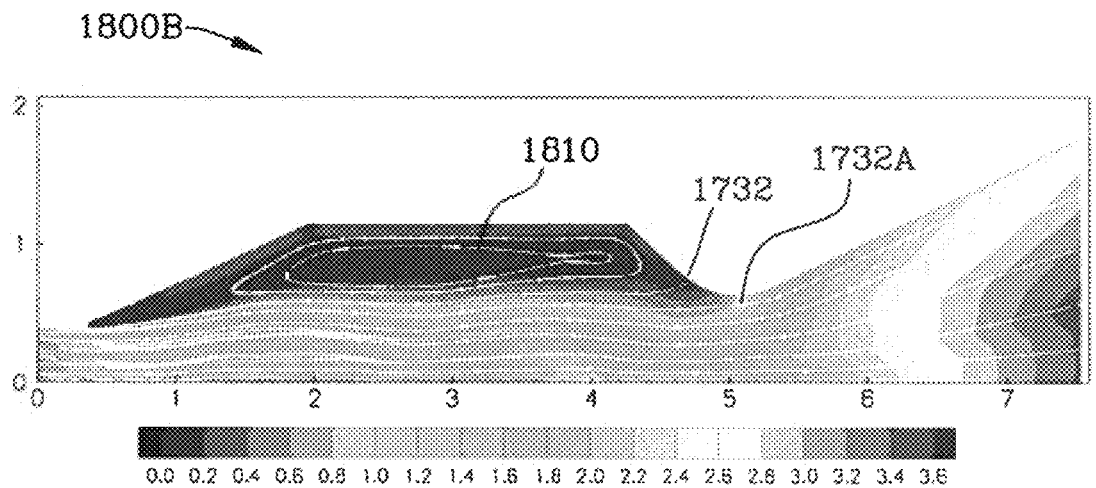
FIG. 18B is an illustration of the Mach number contours within the engine for the flight. Mach number 8.0 scramjet.
Figure 18C:
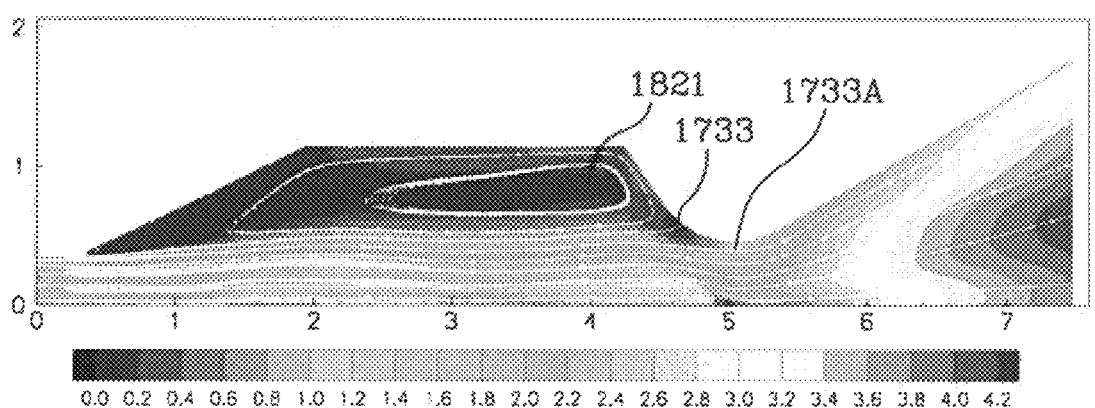
FIG. 18C is an illustration of the Mach number contours within the engine for the flight Mach number 12.0 scramjet.

Contours of Mach number for flight Mach numbers 5, 8 and 12 in the scramjet mode flight conditions appear in FIGS. 18A, 18B, and 18C. All three cases for flight Mach numbers 5, 8 and 12 exhibit periodic wave structure in the free-jet, and an overall increase in cross-sectional area due to combustion as the jet traverses the combustion chamber. In all cases the free-jet rejoins the nozzle throat contour and expands to the exit area. The free jet drives a primary recirculation zone in the combustion chamber, the center of which moves aft with increasing flight Mach number. Streamlines in the combustion chamber define the recirculation zone. In the inlet section, and continuing in a conical non-influence region of the free-jet, supersonic combustion elevates the pressure to a level higher than that of the reference pressure at the inflow plane. The highest pressure occurs on the axis, followed by an expansion initiated at the jet boundary. In the Mach 8 and 12 cases, the recirculation zone equilibrates to the pressure at the radial step and the bounding streamline issues axially with little initial deflection. In the Mach 5 case, the recirculation zone equilibrates to a lower pressure, causing an initial expansion of the free-jet at the step. All cases show a subsequent divergence of streamlines required to accommodate the continuing supersonic combustion process while matching combustion chamber pressure. This "entry interaction" initiates the repetitive streamline structure characteristic of an underexpanded jet. The severity of the entry interaction depends on the initial rate of mixing and combustion in the free-jet, and its initial pressure with respect to the recirculation zone. The wavelength and shock losses associated with the streamline structure depend on the entry interaction. At the combustor exit, the Mach 5 case approaches a sonic condition, and its wave structure disappears. Streamlines in the Mach 8 case appear to be approximately in phase with the throat geometry, and the streamlines merge smoothly into the minimum area. The Mach 12 case however, exhibits an "exit interaction" as streamlines are forced to converge, resulting in a strong shock wave on the axis. This interaction could obviously be eliminated by reducing the wavelength of the shock structure or moving the throat, but of most benefit from a propulsion standpoint would be to eliminate the periodic streamline structure altogether by mitigating the entry interaction.

FIG. 18A is an illustration 1800A of the Mach number contours within the engine for the flight Mach number 5.0 scramjet. FIG. 18B is an illustration 1800B of the Mach number contours within the engine for the flight Mach number 8.0 scramjet. FIG. 18C is an illustration 1800C of the Mach number contours within the engine for the flight Mach number 12.0 scramjet. Referring to FIG. 18A, reference numeral 1801 indicates a magnitude of about Mach 0.0 located in the recirculation zone of the forward portion of the combustion chamber.

Referring to FIG. 18B, reference numeral 1810 indicates a magnitude of about Mach 0.0 located in the recirculation zone in the middle of the combustion chamber. Referring to FIG. 18C, reference numeral 1821 represents a magnitude of about Mach 0.0 located in the recirculation zone of the aft portion of the combustion chamber.

Figure 19A:
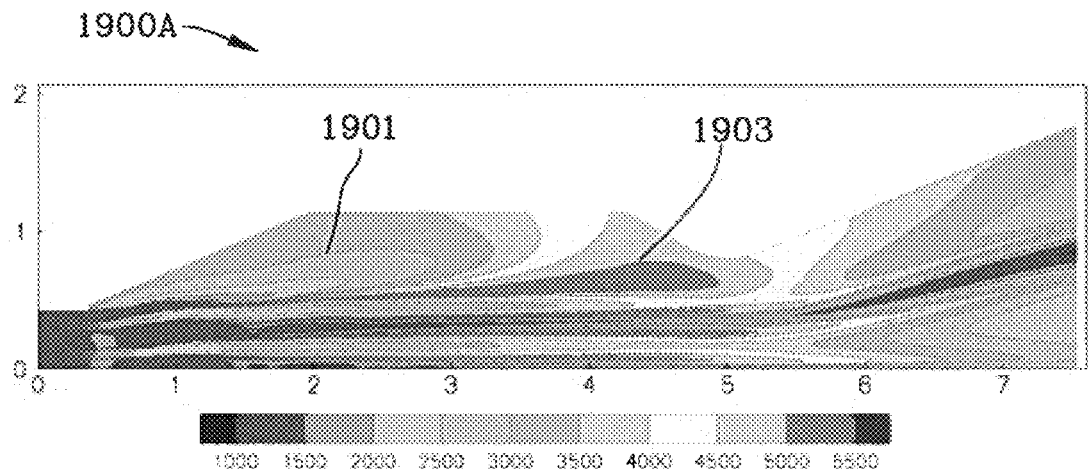
FIG. 19A is an illustration of the static temperature contours within the engine for the flight Mach number 5.0 scramjet.
Figure 19B:
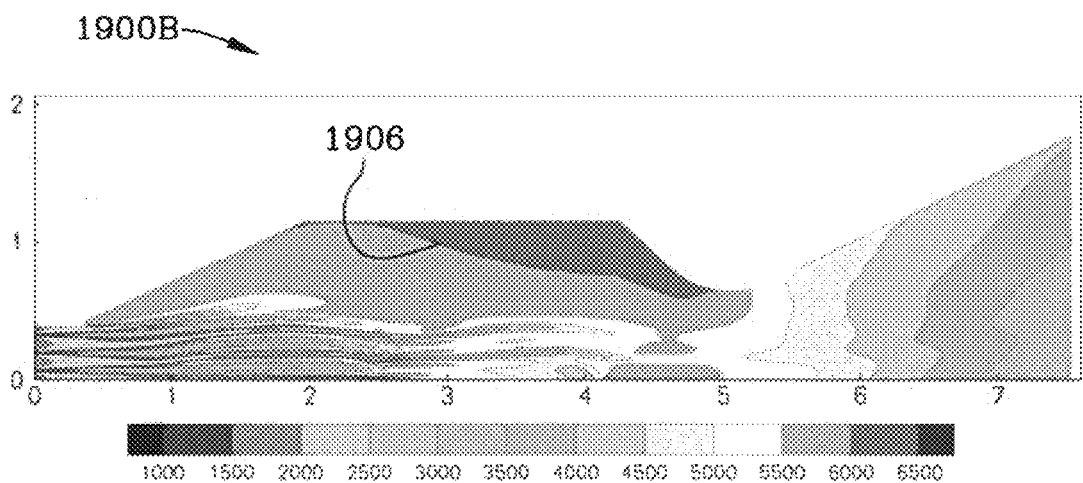
FIG. 19B is an illustration of the static temperature contours within the engine for the flight Mach number 8.0 scramjet.
Figure 19C:
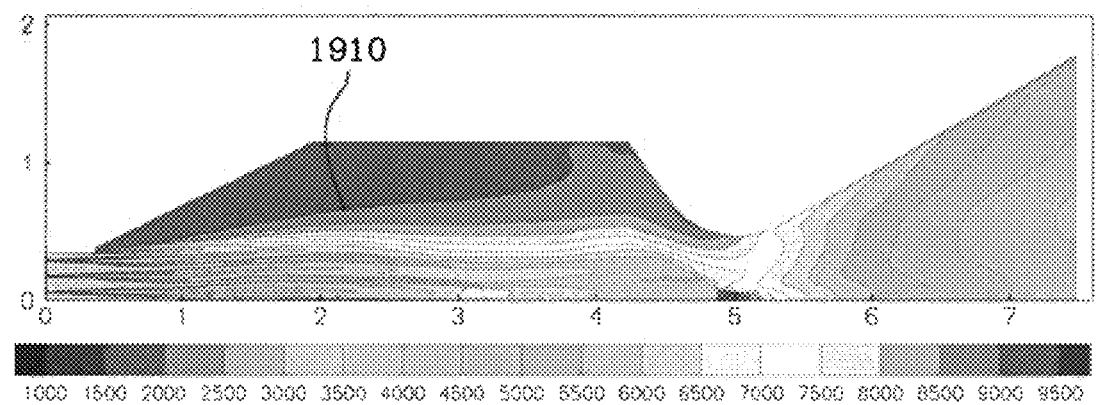
FIG. 19C is an illustration of the static temperature contours within the engine for the flight Mach number 12.0 scramjet.

FIG. 19A is an illustration of the static temperature contours 1900A within the engine for the flight Mach number 5.0 scramjet. FIG. 19B is an illustration of the static temperature contours 1900B within the engine for the flight Mach number 8.0 scramjet. FIG. 19C is an illustration of the static temperature contours 1900C within the engine for the flight Mach number 12.0 scramjet.

Referring to FIG. 19A, reference numeral 1901 indicates a temperature of about 3500° R and reference numeral 1903 indicates a temperature of about 5000° R. Referring to FIG. 19B, reference numeral 1906 indicates a temperature of about 6000° R. Referring to FIG. 19C, reference numeral 1910 indicates a temperature of about 9000° R.

Temperature contours appear in FIGS. 19A, 19B and 19C. The effects of combustion are apparent in the individual shear layers. The Mach 5 case shows a degree of stratification that persists into the nozzle throat. The recirculation zone equilibrates to greater than 90% of the ethylene-air theoretical value in the Mach 8 and 12 cases, but is significantly cooler in the Mach 5 case. This is likely due to the two-injector arrangement used in the Mach 5 case, and suggests that the recirculation zone temperature and combustor heat load depend on the fuel injection method, and could be reduced in future design iterations. Exit interaction in the Mach 12 case may also contribute to elevated temperature in the recirculation zone.

In order to make a quantitative assessment of the losses in the free-jet combustion process, and their effect on net thrust, mass-averaged axial distributions of pressure, temperature, and velocity were obtained during the analysis. The combustor friction coefficient thus represents the momentum loss associated with the recirculation zone and shock structure in the free-jet. The ideal net thrust per unit airflow is illustrated in FIG. 20.

Figure 20:
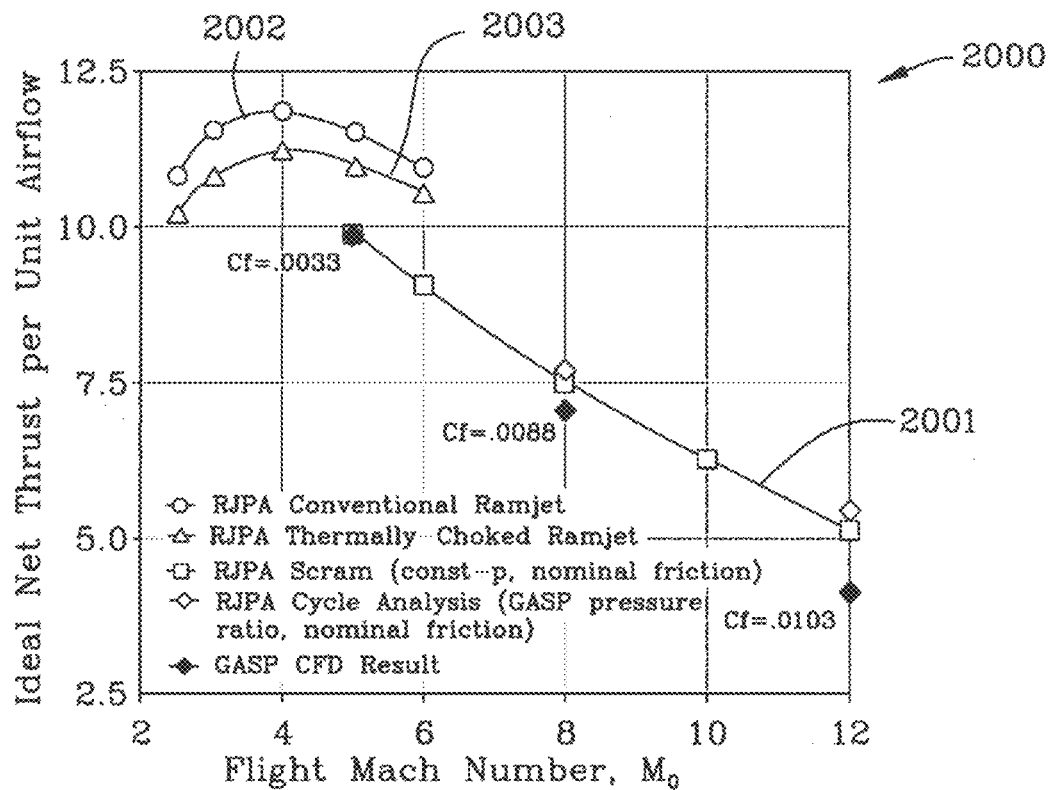
FIG. 20 illustrates ideal net thrust per unit airflow against flight Mach numbers for a conventional ramjet, thermally-choked ramjet and a scramjet.

FIG. 20 illustrates the ideal net thrust per unit airflow based on use of different computational methods/tools. FIG. 20 illustrates ideal net thrust per unit of airflow against flight Mach numbers for a conventional ramjet, thermally-choked ramjet and a scramjet. Reference numeral 2001 represents the ideal net thrust for scramjet mode operation. Reference numeral 2003 represents the ideal net thrust for the thermally choked operation such as in Curran et al. Reference numeral 2002 represents the ideal net thrust for the ramjet disclosed herein. FIG. 20 illustrates a comparison of a thermally choked ramjet to the dual-mode ramjet disclosed herein. The subsonic combustion ramjet disclosed herein is 6-8% more efficient than the thermally-choked or "dual-mode" ramjet as a consequence of lower combustion Mach number. Of greater significance than higher performance however, is the practicality of fuel distribution and flame-holding in the conventional ram burner.

Figure 21:
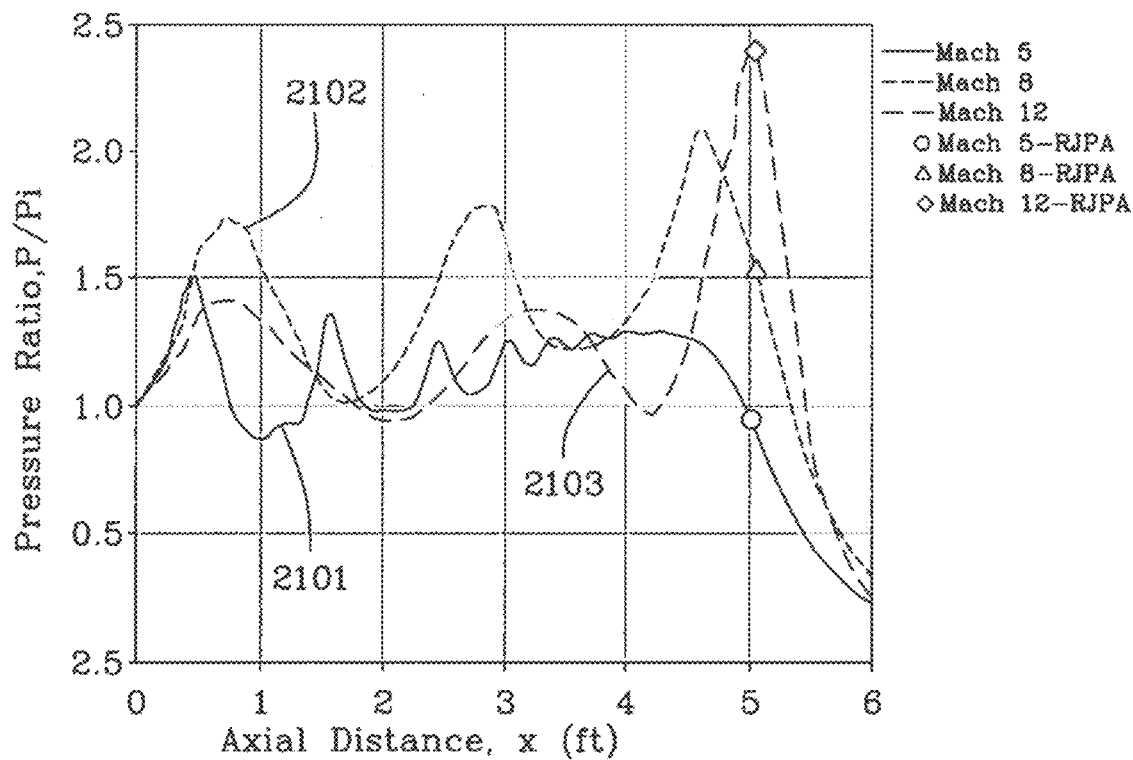
FIG. 21 illustrates the mass-averaged static pressure distributions with the pressure at the nozzle throat station (supersonic combustor exit) denoted by symbols.

FIG. 21 illustrates the mass-averaged static pressure distributions 2100 with the pressure at the nozzle throat station denoted by symbols (supersonic combustor exit) for various flight conditions, to with, scramjet flight Mach numbers 5, 8 and 12. Reference numeral 2101 represents Mach 5 pressure ratio data, reference numeral 2102 represents Mach 8 pressure ratio data, and reference numeral 2103 represents Mach 12 pressure ratio data. Compression due to mixing and combustion in the cylindrical inlet section from station zero to 0.36 feet is evident, as is the subsequent expansion and periodic streamline structure. As the free-jet traverses the combustion chamber, the mean pressure is generally above the inflow value, consistent with the elevated recirculation zone pressures. The Mach 5 pressure distribution shows a damped character as combustion drives the free-jet toward a sonic condition. Of interest is the phase shift and elevated amplitude of the last peak in the Mach 12 case consistent with the exit interaction seen in the pressure contours. Note that the combustor exit pressure (at the minimum area) used for cycle analysis of the Mach 8 and 12 solutions is significantly higher than the inflow, and would cause a discrepancy with cycle analysis assuming combustion at constant pressure.

Figure 21A:
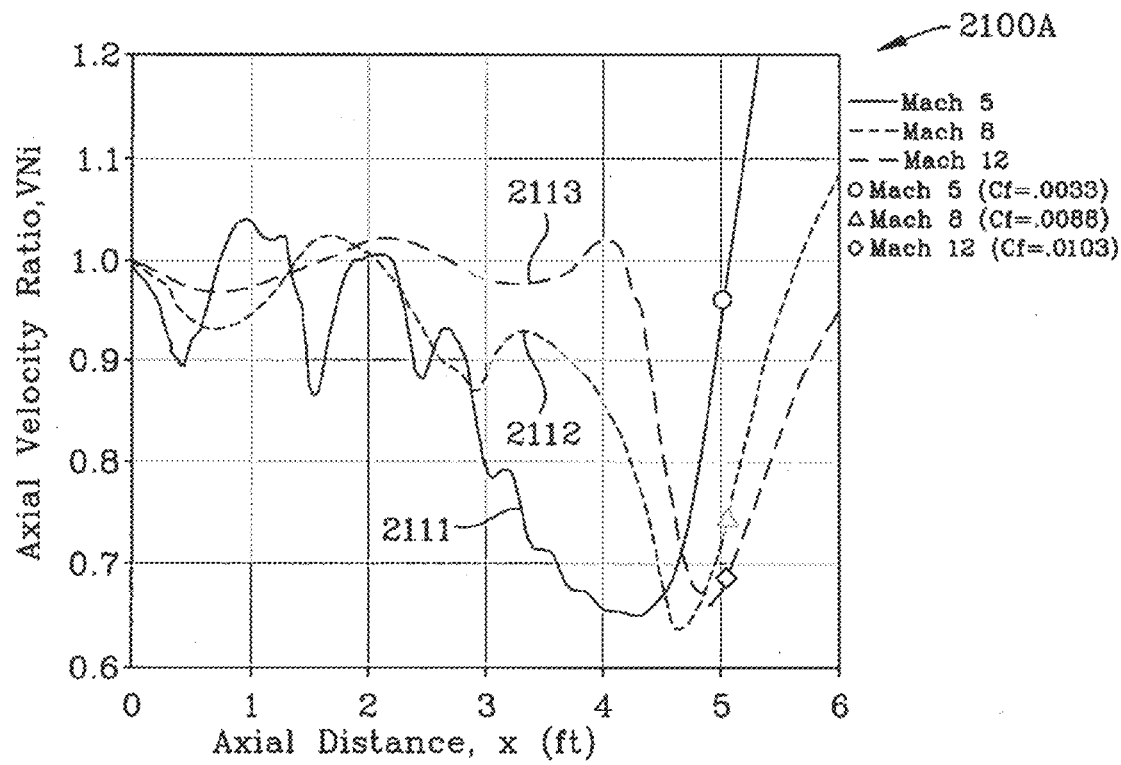
FIG. 21A illustrates the mass-averaged axial velocity distributions for various flight conditions.

FIG. 21A illustrates the mass-averaged axial velocity ratio (V/V inlet) distributions 2100A for various flight conditions, to with, scramjet flight Mach numbers 5, 8 and 12. Reference numeral 2111 represents Mach 5 velocity ratio data, reference numeral 2112 represents Mach 8 velocity ratio data, and reference numeral 2113 represents Mach 12 velocity ratio data. A marked reduction in velocity occurs upstream of the throat station for the Mach 8 and 12 cases, and is more gradual for the Mach 5 case, consistent with the pressure distributions. The loss coefficients used to match the combustor exit velocities are listed in the FIG. 21A. Shock and viscous losses are represented in these values, and an estimate of their relative contributions to the total is not determined. Shock losses arise from the entry and exit interactions discussed above, and may be reduced by better tailoring of the combustion process, and optimization of the combustion chamber geometry. The viscous loss arises from the momentum required to drive the recirculating flow in the combustion chamber, which presumably is a function of the combustion chamber volume and wetted area. These are determined by the cross-sectional area required at the minimum ramjet Mach number, subsonic diffuser length requirements, and the free jet length required for supersonic mixing and combustion.

Figure 21B:
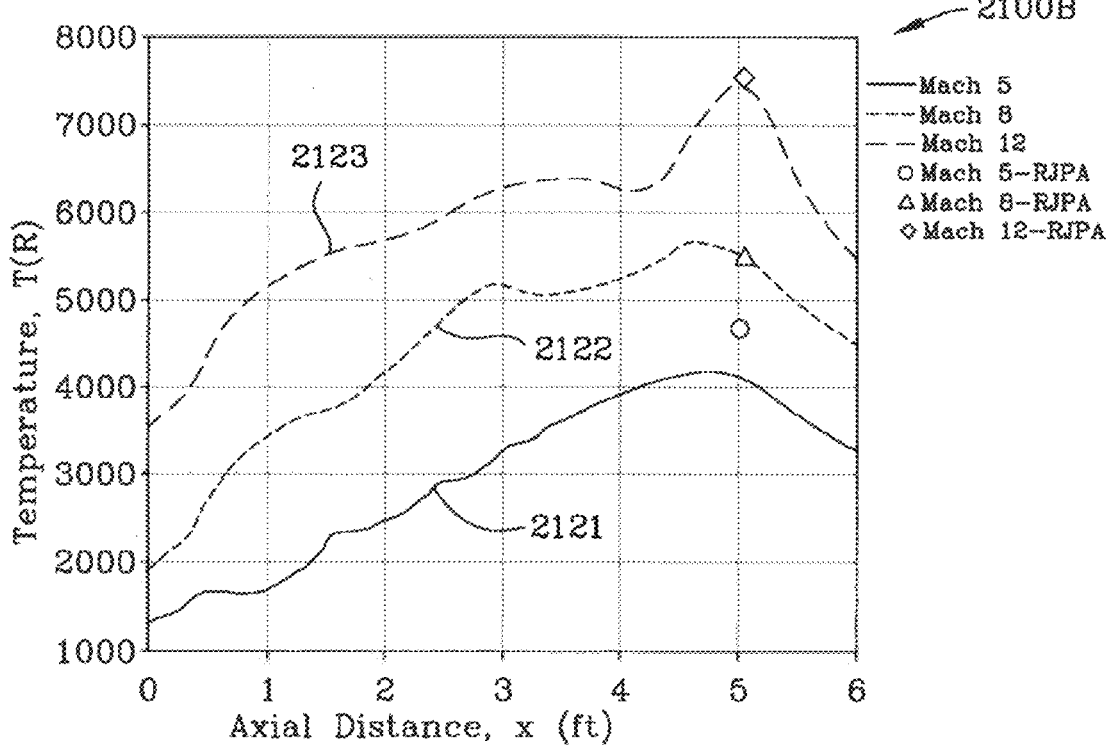
FIG. 21B illustrates the mass-averaged temperature distributions for flight Mach numbers 5, 8 and 12.

FIG. 21B illustrates the mass-averaged temperature distributions 2100B for scramjet mode flight Mach numbers 5, 8 and 12. Reference numeral 2121 indicate Mach 5 temperature data as a function axial position, reference numeral 2122 indicate Mach 8 temperature data as a function axial position, and reference numeral 2123 represents Mach 12 temperature data as a function of axial position. Temperatures increase with increasing Mach flight numbers.

Figure 23:
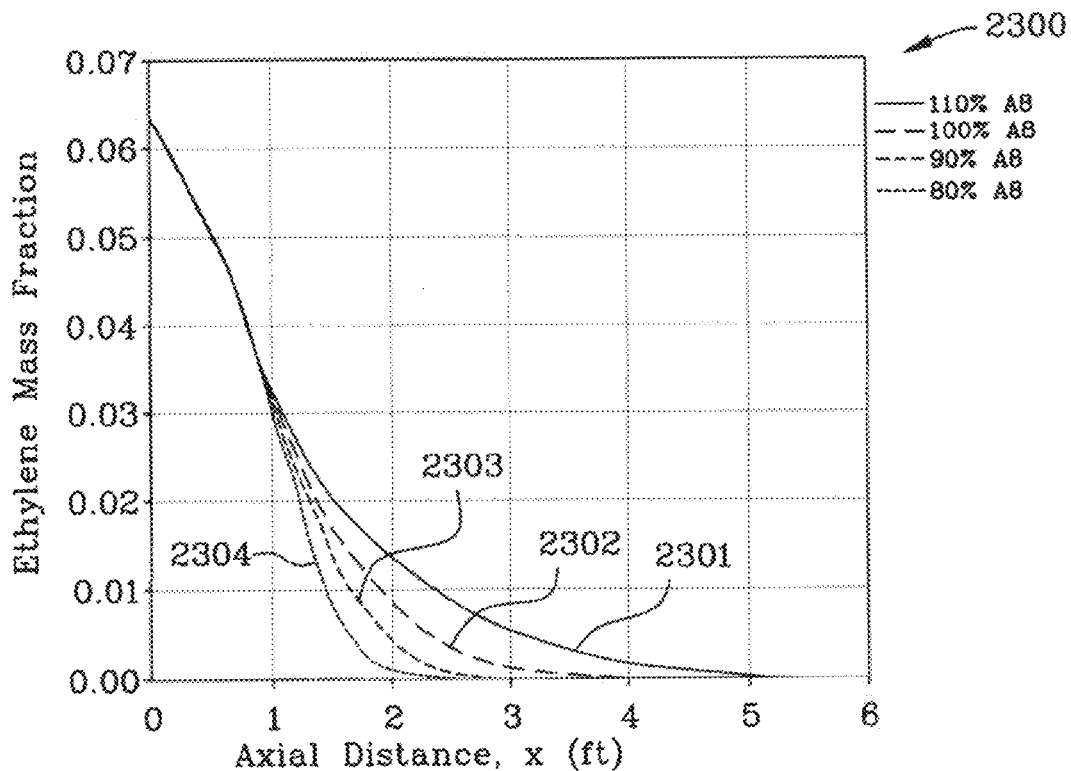
FIG. 23 illustrates the effect of nozzle throat area variation for scramjet mode flight Mach number 8 on the rate of ethylene fuel-depletion.
Figure 23A:
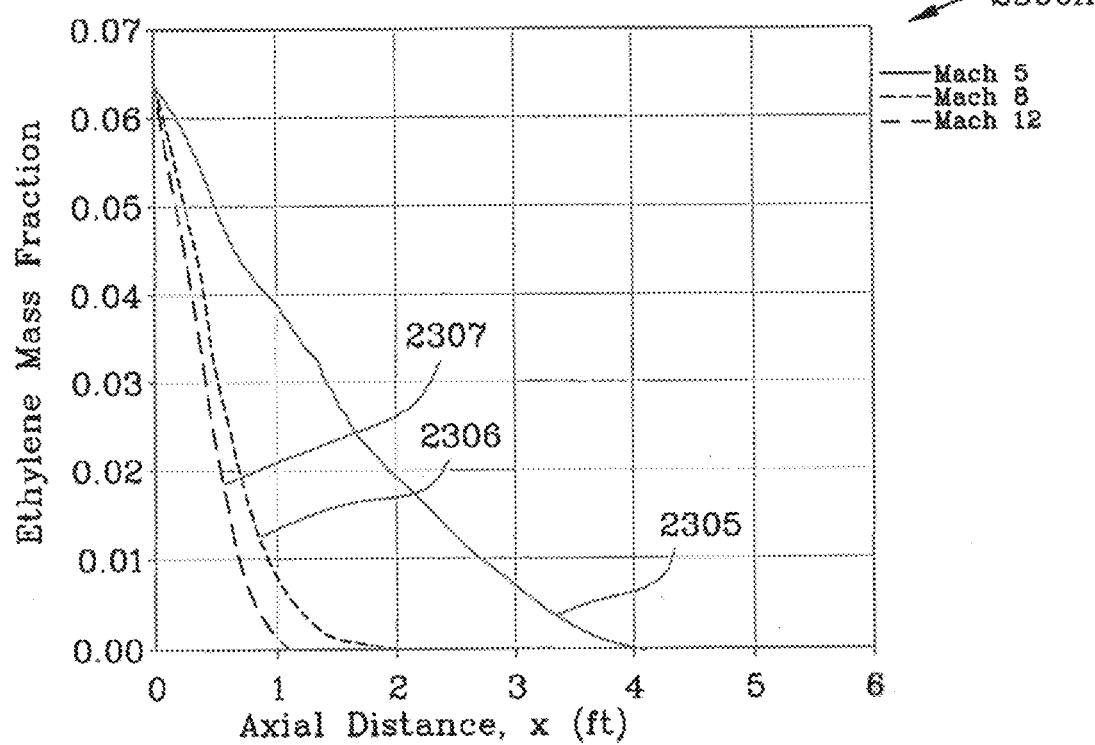
FIG. 23A illustrates the ethylene mass fraction for flight Mach numbers 5, 8 and 12 versus axial position.

FIG. 23A illustrates the ethylene mass fraction 2300A for flight Mach numbers 5, 8 and 12 versus axial position. Reference numeral 2305 signifies the flight Mach number 5, reference numeral 2306 signifies the flight Mach number 8, and reference numeral 2307 signifies the flight Mach number 12.

Calculations at various nozzle throat areas were performed in order to evaluate the effect on recirculation zone pressure, entry and exit interactions, and performance at the flight Mach number 8 as illustrated in FIGS. 11 and 16A. FIGS. 22A, 22B, 22C and 22D illustrate static pressure contours for throat areas equal to 110%, 100%, 90% and 80% of the design value. FIG. 17B and FIG. 22B are identical but different data is presented and discussed in connection with each drawing figure.

FIG. 22A illustrates the static pressure ratio 2200A for scramjet mode flight Mach number 8 with the variable nozzle throat positioned at 110% of the design operating point. Reference numeral 2201 indicates a stagnation streamline and reference numeral 2202 indicates the pressure ratio of 0.95 located in recirculation zone of the combustion chamber (110% nozzle throat ratio). When viewing FIG. 22A, everything to the left of stagnation streamline 2201 is in the recirculation zone. Reference numeral 2221T is the nozzle throat location (110% nozzle throat area ratio).

FIG. 22B illustrates the static pressure ratio 2200B for scramjet mode flight Mach number 8 with the variable nozzle throat positioned at 100% of the design operating point. Reference numeral 2203 represents a stagnation streamline and reference numeral 2204 indicates a pressure ratio of 1.32 located in the recirculation zone of combustion chamber (100% nozzle throat ratio). When viewing FIG. 22B, everything to the left of stagnation streamline 2203 is in the recirculation zone. Reference numeral 2223T is the nozzle throat location (100% nozzle throat ratio).

FIG. 22C illustrates the static pressure ratio 2200C for scramjet mode flight Mach number 8 with the variable nozzle throat positioned at 90% of the design operating point. Reference numeral 2205 represents a stagnation streamline and reference numeral 2206 is the pressure ratio of 1.60 located in recirculation zone of combustion chamber (90% nozzle throat ratio). When viewing FIG. 22C, everything to the left and above the stagnation streamline 2205 is in the recirculation zone. Reference numeral 2225T is the nozzle throat location (90% nozzle throat ratio).

FIG. 22D illustrates the static pressure ratio 2200D for scramjet mode flight Mach number 8 with the variable nozzle throat positioned at 80% of the design operating point. Reference numeral 2207 represents the stagnation streamline and reference numeral 2208 represents the pressure ratio of 1.87 located in recirculation zone of combustion chamber (80% nozzle throat ratio). When viewing FIG. 22D, everything to the left and above stagnation streamline 2207 is in the recirculation zone. Reference numeral 2227T is the nozzle throat location (80% nozzle throat ratio).

As throat area is reduced, combustion chamber pressure increases, and the period of the streamline structure decreases. As expected, combustion in the inlet section, and a short distance downstream is not affected. Beyond this however, increased pressure increases the rate of combustion, reinforcing the tendency toward shorter wavelengths. Reference numerals 2201, 2203, 2205 and 2207 represent the streamlines and streamline 2207 (variable nozzle throat at 80% of design value) has a shorter wavelength than streamline 2201 (variable nozzle throat at 110%) or streamline 2203 (variable nozzle throat at 100%). Further, the pressure increase in the combustion chambers is viewed in FIGS. 22A, 22B, 22C and 22D as the variable nozzle's area is reduced. Referring back now to FIGS. 22A-D, it is evident that the free jet entry conditions range from under-expanded at 110% throat area to over-expanded at 80%, but the streamline structure is never eliminated due to the rapidity of combustion and divergence of streamlines in the inlet region. The severity of the exit interaction depends on synchronization of the streamline structure with the throat geometry. The streamline 2203 associated with the variable nozzle throat at 100% of the design case appears to be in phase and exhibits almost no exit interaction with the nozzle throat. Reference numeral 2223T represents the variable nozzle throat for the 100% example. Reference numerals 2221T, 2225T and 2207T represent the throats in the examples where the variable nozzle throat is 110%, 90% and 80%, respectively. Interference with the throat is greatest for the 80 and 110% cases which show the strongest interactions.

FIG. 23 illustrates the effect of nozzle throat area variation 2300 for scramjet mode flight Mach number 8 on the rate of ethylene fuel depletion. Reference numeral 2301 signifies the effect of throat area variation on ethylene mass fraction (110% nozzle throat ratio), reference numeral 2302 signifies the effect of throat area variation on ethylene mass fraction (100% nozzle throat ratio), reference numeral 2303 signifies the effect of throat area variation on ethylene mass fraction (90% nozzle throat ratio), and reference numeral 2304 signifies the effect of throat area variation on ethylene mass fraction (80% nozzle throat ratio).

Figure 24:
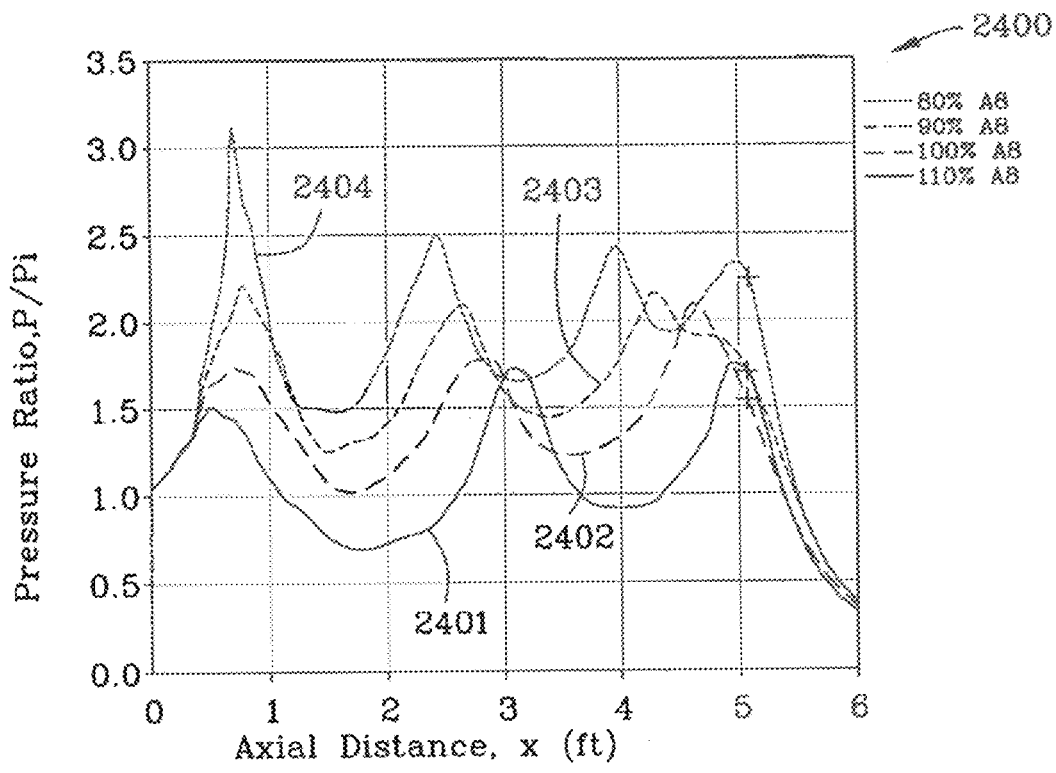
FIG. 24 illustrates the effect of nozzle throat area variation on mass-averaged static pressure distribution for scramjet mode flight Mach number 8.

FIG. 24 illustrates the effect of nozzle throat area variation on mass-averaged static pressure distribution 2400 for scramjet mode flight Mach number 8. Reference numeral 2401 signifies the effect of throat area variation on mass averaged static pressure distribution for the flight Mach number 8 (110% nozzle throat ratio), reference numeral 2402 signifies the effect of throat area variation on mass averaged static pressure distribution for the flight Mach number 8 (100% nozzle throat ratio), reference numeral 2403 signifies the effect of throat area variation on mass averaged static pressure distribution for the flight Mach number 8 (90% nozzle throat ratio), and reference numeral 2404 signifies the effect of throat area variation on mass averaged static pressure distribution for the flight Mach number 8 (80% nozzle throat ratio).

Mass-averaged pressure distributions for scramjet mode flight Mach number 8 illustrated in FIG. 24 also show that as throat area is reduced, the initial pressure rise increases, the period of the streamline structure decreases, and the mean is approximately equal to the recirculation zone pressure. Peak-to-peak amplitude is roughly the same for all cases. Note that for the 100% case, the waveform merges smoothly with the nozzle expansion. The designation A8 in FIG. 24 refers to FIG. 11, station 8, reference numeral 1108. The 110% case shows a slight slope discontinuity just prior to the throat station and the 80 and 90% cases show out-of-phase features at the throat, consistent with the interactions seen in the pressure contours.

The effect of throat area variation was to change the combustion chamber pressure and the period of the streamline structure without significantly altering its amplitude. The amplitude of the primary streamline structure is, therefore, most likely dependent on the initial rate of combustion. The exit interaction was affected by the phasing of the shock structure and was nearly eliminated in the 100% throat area case. The adiabatic wall temperature and the gas temperature in the recirculation zone were not significantly affected by throat area variation.

Figure 25:
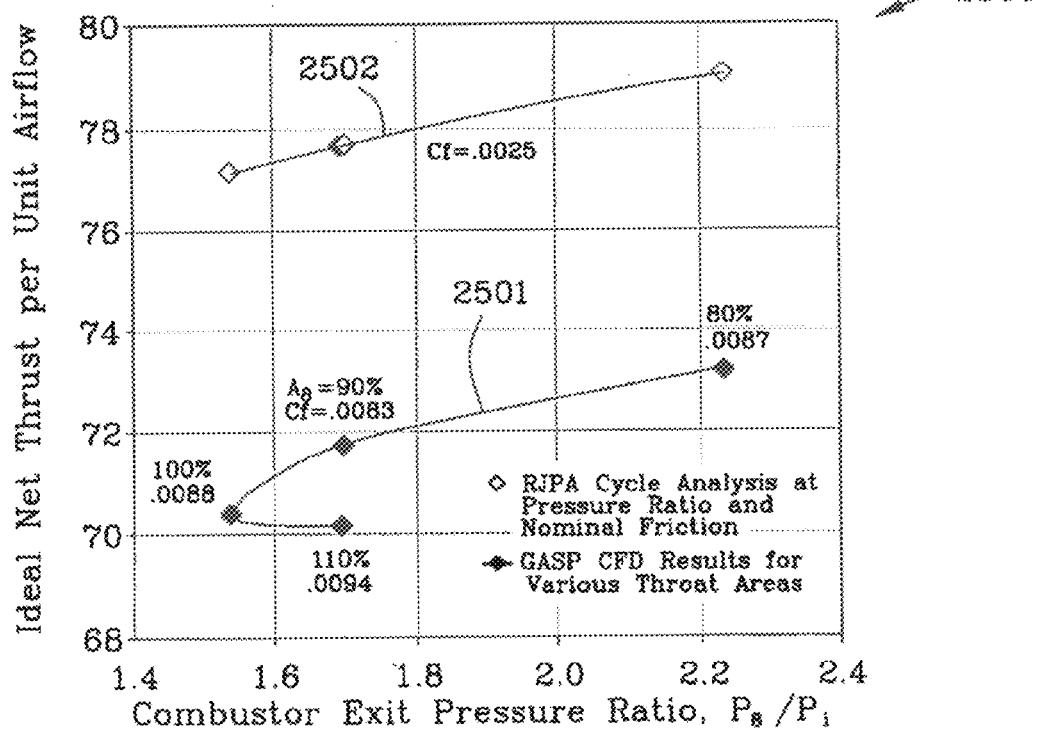
FIG. 25 illustrates the ideal net thrust per unit of airflow plotted against combustor exit pressure ratio and nozzle throat area variation for scramjet mode flight Mach number 8.

FIG. 25 illustrates 2500 the ideal net thrust per unit of airflow plotted against combustor exit pressure ratio and nozzle throat area variation for scramjet mode flight Mach number 8. The ideal net thrust per unit airflow for the example of scramjet flight Mach number 8 for variable nozzle throat opening ratios (80%, 90%, 100% and 110%) is plotted 2501 versus the mass-averaged combustor exit pressure ratio in FIG. 25. Reference numeral 2502 represents the ideal net thrust per unit airflow with a Cf of 0.0025. Friction loss coefficients required to match the exit velocities are also listed with the throat area for each point. The 90% variable nozzle throat case exhibits the least momentum loss, the 110% case the greatest, and despite the entry and exit interactions seen in pressure contours for the 80% case, its loss coefficient is slightly less than the 100% case which showed little interaction. This relative insensitivity and lack of correlation of loss coefficient to throat area is not unexpected however, since the amplitude of the basic streamline structure, and presumably the viscous loss component were not significantly affected. Cycle analysis results at the corresponding pressure ratios and with nominal momentum loss are also plotted for reference and to show the basic sensitivity of scramjet net thrust to combustor pressure ratio.

REFERENCE NUMERALS

Reference numerals 10-86 pertain to the prior art.
10—aircraft
12—ramjet combustion engine
14—inlet scoop
16—exhaust outlet
17, 18, 19—walls
20—fourth wall
21—converging inlet cowl passage
22—diverging supersonic combustion section
24—substantially uniform cross section subsonic combustion section
26—exit nozzle
27—pilot zone recesses
28—fuel pump
30—fuel control system
32—plurality of nozzles
34—fuel control system
36—plurality of nozzles
40—central body
42—elongated inlet spike
43—flameholders
44—exhaust plug
46—annular member
47, 48—struts
49—fuel pump
50—subsonic combustion chamber
51—fuel control
52—nozzles 52 in the struts 47
55—nozzles supplied from fuel ducts
56—fuel ducts
58—recesses
60—supersonic combustion chamber
61—fuel control
62, 64—nozzles
65—ducts
70, 72—pumps
74, 75—nozzles
76, 78—fuel control system
80—supersonic combustion chamber
82—subsonic chamber
86—recess pilot zones
600—cross-sectional view of a prior art dual mode supersonic ramjet engine operating in the scramjet mode 601—fuel injection nozzle
602—inlet contraction section
603—diverging supersonic combustion section
604—exit nozzle
605—fuel-air mixture
606, 606A, 880—incoming air being compressed
607, 607A, 881—exiting combustion gases
608—interior wall of engine
700—cross-sectional view of a prior art dual mode supersonic ramjet engine operating in the thermally-choked ramjet mode
701—shock train to subsonic ramjet mode
702—beginning of shock train to subsonic ramjet mode
703—fuel injector
704—fuel injector Reference numerals 800 and above pertain to the disclosed and claimed invention.

800—perspective view of dual-mode combustor operating in the ramjet mode
    800A—cross-sectional schematic view of the dual-mode combustor operating in the ramjet mode
    800B—quarter sectional schematic view of the dual-mode combustor operating in the ramjet mode
    800C—enlarged portion of FIG. 8A illustrating the radial step and the multimode fuel injector
    801—inlet contraction section
    802—inlet minimum area, variable diameter inlet cylindrical passageway/section
    803—radial step
    804—subsonic diffuser section
    805—combustion chamber
    806—nozzle contraction section
    807—variable nozzle throat at the joining point of the contraction section 806 and the expansion section 808 in the ramjet mode or the scramjet mode
    808—nozzle expansion section
    810—ramjet mode flame holder
    812—beginning of radial step 803
    812A—end of radial step 803
    830—terminal shock waves, position controlled by algorithm governing nozzle throat position
    841—supersonic compression
    842—arrow indicating fuel injected
    8421—multimode fuel injector
    844—subsonic diffusion and fuel mixing
    845—subsonic combustion
    845A—supersonic combustion
    846—contraction to choked throat
    847, 847A—expansion
    850—aperture in flame holder 810 for the passage of the free-jet
    872—heat release
    899—dual-mode combustor
    900—perspective view of dual-mode combustor operating in the scramjet mode
    900A—cross-sectional schematic view of the dual-mode combustor operating in the scramjet mode
    900B—quarter sectional schematic view of the dual-mode combustor operating in the scramjet mode
    900C—cross-sectional perspective view of the diffuser illustrating the array of flame holders 810 and a central aperture 850 within the array of flame holders 810
    943—free-jet in the scramjet mode
    943A—supersonic free jet boundary wherein the pressure is approximately equal with that of the recirculation zone
    944—recirculation zone
    972—heat release
    1000—perspective view of a dual-mode combustor using different geometry
    1001—inlet contraction section
    1002—inlet minimum area
    1003—step
    1004—subsonic diffuser section
    1005—combustion chamber
    1006—nozzle contraction section
    1007—variable nozzle throat at the joining point of the contraction section 1006 and the expansion section 1008
    1008—expansion section
    1100—quarter sectional view of the dual-mode combustor in the scramjet mode for flight Mach number 8
    1100A—dimensional information for the quarter sectional view of the dual-mode combustor in the scramjet mode for flight Mach number 8
    1100B—view of receiving joint forming the nozzle throat
    1101—station 1, end of cylindrical inflow section
    1102—station 2, beginning of cylindrical combustion chamber
    1107—station 7, end of cylindrical combustion chamber
    1108—station 8, nozzle throat
    1121—cylindrical inflow chamber
    1121A—hinge and aft facing step
    1122—diffuser section
    1122A, 1123A, 1127, 1128—hinge, sliding joint
    1123—combustion chamber
    1124—contraction section
    1125—arc section
    1126—expansion section
    1124B—nozzle contraction section
    1126B—nozzle expansion section
    1126R—receiving joint
    1125B—arc section
    1125R—receiving joint
    1129—termination of expansion section
    1180—station zero, station i, air inlet from air inlet contraction device
    1180A—multi-mode fuel injectors
    1181—arrows representing incoming air
    1200—illustration of flight Mach number versus thermal throat for prior art device, geometric/nozzle throat for dual-mode combustor of present invention in ramjet mode and in scramjet mode as a ratio of inlet capture area, and inlet throat in ramjet mode and scramjet mode as a ratio of inlet capture area
    1200A—table of flight Mach numbers versus inlet contraction ratios, Ac/Ai
    1200B—variable nozzle throat position schematic
    1201—thermal throat of prior art device
    1202—geometric/nozzle throat expressed as a ratio of nozzle throat area to inlet capture area in ramjet mode
    1203—dual mode combustor, inlet throat in ramjet mode
    1203A—dual mode combustor, inlet throat in scramjet mode
    1204—discontinuity/jump of variable nozzle throat position between the ramjet mode 1202 and the scramjet mode 1205
    1205—geometric/nozzle throat expressed as a ratio of nozzle throat area to inlet capture area in scramjet mode
    1206—desired ramjet nozzle throat position as a function of flight Mach number for the ramjet mode
    1207, 1209—switch
    1208—desired ramjet nozzle throat position as a function of flight Mach number for the scramjet mode 1210—controller operating on the difference of desired position of the nozzle throat minus the actual position of the nozzle throat
1211—output of controller
1212—nozzle throat positioner
1213—position signal
1214—variable geometric nozzle throat
1215, 1217—interconnecting signal transmission lines
1216—nozzle throat position sensor
1218—actual nozzle throat position as a function of flight Mach number
1230—inlet contraction ratio
1231—combustion process
1300A—quarter-sectional schematic profile of the dual-mode combustor in the ramjet mode, flight Mach number 2.5
1300B—quarter-sectional schematic profile of the dual-mode combustor in the ramjet mode, flight Mach number 3
1300C—quarter-sectional schematic profile of the dual-mode combustor in the ramjet mode, flight Mach number 4
1301A, 1311A, 1321A—arc section
1301C, 1311C, 1321C—combustion chamber
1301D, 1311D, 1321D—diffuser section
1301E, 1311E, 1321E—expansion section
1301I, 1311I, 1321I—inlet section
1301N, 1311N, 1321N—variable nozzle throat section
1301X, 1311X, 1321X—contraction section
1400A—quarter-sectional schematic profile of the dual-mode combustor in the ramjet mode, flight Mach number 5
1400B—quarter-sectional schematic profile of the dual-mode combustor in the scramjet mode, flight Mach number 5
1401A, 1411A—arc section
1401C, 1411C—combustion chamber
1401D, 1411D—diffuser section
1401E, 1411E—expansion section
1401I, 1411I—inlet section
1401N, 1411N—variable nozzle throat section
1401X, 1411X—contraction section
1500A—quarter-sectional schematic profile of the dual-mode combustor in the ramjet mode, flight Mach number 6
1500B—quarter-sectional schematic profile of the dual-mode combustor in the scramjet mode, flight Mach number 6
1501A, 1511A—arc section
1501C, 1511C—combustion chamber
1501D, 1511D—diffuser section
1501E, 1511E—expansion section
1501I, 1511I—inlet section
1501N, 1511N—variable nozzle throat section
1501X, 1511X—contraction section
1600A—quarter-sectional schematic profile of the dual-mode combustor in the scramjet mode, flight Mach number 8
1600B—quarter-sectional schematic profile of the dual-mode combustor in the scramjet mode, flight Mach number 10
1600C—quarter-sectional schematic profile of the dual-mode combustor in the scramjet mode, flight Mach number 12
1601A, 1611A, 1621A—arc section
1601C, 1611C, 1621C—combustion chamber
1601D, 1611D, 1621D—diffuser section
1601E, 1611E, 1621E—expansion section
1601I, 1611I, 1621I—inlet section
1601N, 1611N, 1621N—variable nozzle throat section
1601X, 1611X, 1621X—contraction section
1700A—pressure ratio, P/Pinlet, for the flight Mach number 5.0
1700B—pressure ratio, P/Pinlet, for the flight Mach number 8.0
1700C—pressure ratio, P/Pinlet, for the flight Mach number 12.0
1701—pressure ratio, P/Pinlet, about 1.04 located generally in the forward portion of the combustion chamber
1711-pressure ratio, P/Pinlet, about 1.32 located generally in the forward portion of the combustion chamber
1721—pressure ratio, P/Pinlet, about 1.18 located generally in the forward portion of the combustion chamber
1731, 1732, 1733—stagnation streamline
1731A, 1732A, 1733A—free-jet streamline
1800A—Mach number contours for the flight Mach number 5.0
1800B—Mach number contours for the flight Mach number 8.0
1800C—Mach number contours for the flight Mach number 12.0
1801—about Mach 0.0, located in the recirculation zone of the forward portion of the combustion chamber
1810—about Mach 0.0, located in the recirculation zone in the middle of the combustion chamber
1821—about Mach 0.0, located in the recirculation zone of the aft portion of the combustion chamber
1900A—static temperature contours for the flight Mach number 5.0
1900B—static temperature contours for the flight Mach number 8.0
1900C—static temperature contours for the flight Mach number 12.0
1901—3500° R
1903—5000° R
1906—6000° R
1910—9000° R
2000—ideal net thrust per unit airflow over various flight Mach numbers
2001—scramjet mode net thrust
2002—conventional, prior art, net thrust in the ramjet mode
2003—Curran (prior art) ramjet mode net thrust
2100—mass averaged pressure distributions for scramjet flight mach numbers 5, 8 and 12
2100A—mass averaged axial velocity distributions for scramjet flight mach numbers 5, 8 and 12
2100B—mass averaged temperature distributions for scramjet flight mach numbers 5, 8 and 12
2101—Mach 5 pressure ratio data as a function of axial position
2102—Mach 8 pressure ratio data as a function of axial position
2103—Mach 12 pressure ratio data as a function of axial position
2111—Mach 5 axial velocity ratio data as a function of axial position
2112—Mach 8 velocity ratio data as a function of axial position
2113—Mach 12 velocity ratio data as a function of axial position
2121—Mach 5 temperature data as a function of axial position 2122—Mach 8 temperature data as a function of axial position
2123—Mach 12 temperature data as a function of axial position
2200A—static pressure plot for variable area nozzle throat position at 110% of design point for the flight Mach number 8
2200B—static pressure plot for variable area nozzle throat position at 100% of design point for the flight Mach number 8
2200C—static pressure plot for variable area nozzle throat position at 90% of design point for the flight Mach number 8
2200D—static pressure plot for variable area nozzle throat position at 80% of design point for the flight Mach number 8
2201—stagnation streamline
2202—pressure ratio of 0.95 located in recirculation zone of combustion chamber (110% nozzle throat ratio)
2203—stagnation streamline line
2204—pressure ratio of 1.32 located in recirculation zone of combustion chamber (100% nozzle throat ratio)
2205—stagnation streamline line
2206—pressure ration of 1.60 located in recirculation zone of combustion chamber (90% nozzle throat ratio)
2207—stagnation streamline line
2208—pressure ratio of 1.87 located in recirculation zone of combustion chamber (80% nozzle throat ratio)
2221T—nozzle throat location (110% nozzle throat ratio)
2223T—nozzle throat location (100% nozzle throat ratio)
2225T—nozzle throat location (90% nozzle throat ratio)
2227T—nozzle throat location (80% nozzle throat ratio)
2300—effect of throat area variation on ethylene mass fraction for the flight Mach number 8
2300A—ethylene mass fraction for scramjet mode flight Mach numbers 5, 8 and 12 versus axial position
2301—effect of throat area variation on ethylene mass fraction (110% nozzle throat ratio)
2302—effect of throat area variation on ethylene mass fraction (100% nozzle throat ratio)
2303—effect of throat area variation on ethylene mass fraction (90% nozzle throat ratio)
2304—effect of throat area variation on ethylene mass fraction (80% nozzle throat ratio)
2305—Mach flight number 5 axial position and ethylene mass fraction
2306—Mach flight number 8 axial position and ethylene mass fraction
2307—Mach flight number 12 axial position and ethylene mass fraction
2400—effect of throat area variation on mass averaged static pressure distribution for the flight Mach number 8
2401—effect of throat area variation on mass averaged static pressure distribution for the flight Mach number 8 (110% nozzle throat ratio)
2402—effect of throat area variation on mass averaged static pressure distribution for the flight Mach number 8 (100% nozzle throat ratio)
2403—effect of throat area variation on mass averaged static pressure distribution for the flight Mach number 8 (90% nozzle throat ratio)
2404—effect of throat area variation on mass averaged static pressure distribution for the flight Mach number 8 (80% nozzle throat ratio)
2500—ideal net thrust per unit airflow as a function of nozzle throat pressure ratio, Pnozzle/Pinlet
2501—net thrust per unit airflow for the current free-jet disclosed herein
2502—net thrust per unit airflow with a Cf of 0.0025.
A=Cross-sectional area
Cf=Friction coefficient
D=Nozzle throat diameter ramjet mode
D1=Nozzle throat diameter scramjet mode
H=Hinge/sliding joint
H1=First Arc Hinge/sliding joint
H2=Second Arc Hinge/sliding joint
M=Mach number
P=Pressure
r=Radial distance
x=Axial distance
Z=Altitude

SUBSCRIPTS

0=Freestream
1=Cylindrical inflow section exit station
2=Combustion chamber inlet station
7=Combustion chamber exit station
8=Nozzle throat station
C=Inlet capture area
i=Inflow station
min=Minimum
T=Total Those skilled in the art will readily recognize that the invention has been set forth by way of example only and that changes may be made to the examples without departing from the spirit and the scope of the claims which follow herein below.

The invention claimed is:

1. A dual-mode combustor, comprising:
an inlet contraction section;
an inlet section;
said inlet contraction section interconnected with said inlet section;
a plurality of dual-mode fuel injectors located in said inlet section;
a subsonic diffusion section;
a step interposed between said inlet section and said subsonic diffusion section, said step interconnecting said inlet section with said subsonic diffusion section;
a subsonic combustion chamber; said subsonic diffusion section being interconnected with said subsonic combustion chamber;
a ramjet-mode flame holder, said ramjet-mode flame holder in proximity with said subsonic diffusion section and said subsonic combustion chamber;
a nozzle contraction section interconnected with said subsonic combustion chamber;
a nozzle expansion section;
an arc section, said arc section rotatably interconnected with said nozzle contraction section, said arc section rotatably interconnected with said nozzle expansion section, said arc section rotatably interposed between said nozzle contraction section and said nozzle expansion section, said arc section forming a nozzle throat having a diameter, said nozzle throat being adjustable to a relatively smaller diameter, and, said nozzle throat being adjustable to a relatively larger diameter; and,
said dual-mode combustor being operable in a ramjet mode and a scramjet mode.

2. A dual-mode combustor as claimed in claim 1, wherein said inlet section is hinged to said subsonic diffusion section and has a variable diameter.

3. A dual-mode combustor as claimed in claim 1 wherein a nozzle positioner drives and moves said arc section forming said nozzle throat to a desired diametrical opening.

4. A dual-mode combustor as claimed in claim 3 wherein said ramjet mode includes subsonic operation from about flight Mach number 2.5 up to about flight Mach number 5.0 to 6.0, said scramjet mode includes supersonic operation from about flight Mach number 5.0 to 6.0 up to about flight Mach number 12.0 and greater, said nozzle positioner adjusting said nozzle throat to a relatively larger diameter between about flight Mach number 5.0 to 6.0 transitioning from said ramjet mode to said scramjet mode forming a free-jet from said inlet section, through said subsonic diffusion section, and said combustion chamber, said free-jet rejoins said nozzle throat and exits said combustor through said nozzle expansion section.

5. A dual-mode combustor as claimed in claim 4 wherein said nozzle positioner drives and moves said arc section forming said nozzle throat to a desired diametrical opening according to an algorithm which is a function of flight Mach number and combustor mode.

6. A dual-mode combustor as claimed in claim 4 wherein said ramjet-mode flame holder includes a circular aperture therein and being annularly located in proximity with said subsonic diffusion section and said subsonic combustion chamber, said free-jet passing through said circular aperture of said ramjet-mode flame holder but not engaging said ramjet-mode flame holder.

7. A dual-mode combustor as claimed in claim 1 wherein said inlet contraction section is frusto-conically shaped, said inlet section is cylindrically shaped, said subsonic diffusion section is generally frusto-conically shaped, said subsonic combustion chamber is cylindrically shaped, said nozzle contraction section is generally frusto-conically shaped and said nozzle expansion section is frusto-conically shaped.

8. A dual-mode combustor as claimed in claim 7 wherein said inlet section has a radius, said step interposed between said inlet section and said subsonic diffusion section is about one-tenth of said radius of said inlet section, and, said step extending radially outwardly from said inlet section.

9. A dual-mode combustor as claimed in claim 1 wherein said inlet contraction section, said inlet section, said subsonic diffusion section, said subsonic combustion chamber, said nozzle contraction section, and said nozzle expansion section are rectangularly shaped in cross-section.

10. A dual-mode-combustor as claimed in claim 1 wherein said arc section is rotatably and slidingly interconnected with said nozzle contraction section and said nozzle expansion section, said nozzle contraction section being substantially tangent with respect to said arc section and said nozzle expansion section being substantially tangent to said arc section.

11. A supersonic combustion ramjet engine, comprising:
an inlet contraction section;
an inlet section;
said inlet contraction section interconnected with said inlet section;
a plurality of dual-mode fuel injectors located in said inlet section;
a subsonic diffusion section and a step;
said step interposed between said inlet section and said subsonic diffusion section, said step interconnecting said inlet section and said subsonic diffusion section;
a subsonic combustion chamber; said subsonic diffusion section being interconnected with said subsonic combustion chamber;
a ramjet-mode flame holder, said ramjet-mode flame holder in proximity with said subsonic diffusion section and said subsonic combustion chamber;
a nozzle contraction section interconnected with said subsonic combustion chamber;
a nozzle expansion section;
an arc section, said arc section slidingly interconnected with said nozzle contraction section, said arc section slidingly interconnected with said nozzle expansion section, said arc section slidingly interposed between said nozzle contraction section and said nozzle expansion section, said arc section forming a nozzle throat having a diameter, said nozzle throat being adjustable to a relatively smaller diameter, and, said nozzle throat being adjustable to a relatively larger diameter;
a nozzle positioner drives and moves said arc section forming said nozzle throat to a desired position, said desired position of said nozzle throat being a function of the mode of the combustor and the flight Mach number;
said supersonic combustion ramjet engine being operable in a ramjet mode and a scramjet mode, said ramjet mode includes subsonic operation from about flight Mach number 2.5 up to about flight Mach number 5.0 to 6.0, said scramjet mode includes supersonic operation from about flight Mach number 5.0 to 6.0 up to about flight Mach number 12.0 and greater, said nozzle positioner adjusting said nozzle throat to a relatively larger diameter between about flight Mach number 5.0 to 6.0 transitioning from said ramjet mode to said scramjet mode forming a free jet from said inlet section, through said subsonic combustion chamber, said free-jet rejoins said nozzle throat, and said free jet exits through said nozzle expansion section;
said nozzle positioner drives and moves said arc section forming said nozzle throat to a desired diametrical opening according to an algorithm which is a function of flight Mach number and combustor mode;
said ramjet-mode flame holder includes a circular aperture therein and being annularly located in proximity with said subsonic diffusion section and said subsonic combustion chamber, and, said free jet passing through said circular aperture of said ramjet-mode flame holder but not engaging said ramjet-mode flame holder.

12. A supersonic combustion ramjet engine, comprising:
said supersonic combustion ramjet engine being operable in a ramjet mode and a scramjet mode;
an inlet passageway receiving combustion air;
said inlet passageway includes a fuel injector;
a diffusion section and a combustion chamber; said diffusion section includes an inner periphery;
a radial step interposed between and linking said inlet passageway and said diffusion section;
said inlet passageway in communication with said diffusion section and said diffusion section in communication with said combustion chamber;
a ramjet-mode flame holder, said ramjet-mode flame holder includes an array of igniters, said array of igniters includes a central circular aperture therethrough, said ramjet-mode flame holder residing in said diffusion section and affixed to said inner periphery thereof;
a nozzle contraction section, a variable nozzle throat, and a nozzle expansion section;
said combustion chamber in communication with said nozzle contraction section;
said nozzle contraction section in communication with said variable nozzle throat; and, said variable nozzle throat in communication with said nozzle expansion section.

13. A supersonic combustion ramjet engine as claimed in claim 12 further comprising a nozzle positioner and wherein said nozzle throat includes an arc section, said nozzle positioner drives and moves said arc section forming said nozzle throat to a desired diametrical opening according to an algorithm which is a function of flight Mach number and combustor mode.

14. A supersonic combustion ramjet engine as claimed in claim 13 wherein said algorithm has a discontinuity at a given flight Mach number transitioning from said ramjet mode to said scramjet mode forming a free jet from said inlet section, through said subsonic combustion chamber, said free-jet rejoining said nozzle throat, and said free jet exiting through said nozzle expansion section.

15. A supersonic combustion ramjet engine as claimed in claim 14 wherein said ramjet mode includes subsonic operation from about flight Mach number 2.5 up to about flight Mach number 5.0 to 6.0, said scramjet mode includes supersonic operation from about flight Mach number 5.0 to 6.0 up to about flight Mach number 12.0 and greater, said nozzle positioner adjusting said nozzle throat to a relatively larger diameter between about flight Mach number 5.0 to 6.0 transitioning from said ramjet mode to said scramjet mode forming a free-jet extending from said inlet section at the location of said step to said nozzle throat, said free-jet not engaging said subsonic diffuser, said free-jet not engaging said combustion chamber, and, said free jet rejoining said nozzle throat.

\* \* \* \* \*